(12) United States Patent
Tanaka

(10) Patent No.: US 11,590,639 B2
(45) Date of Patent: Feb. 28, 2023

(54) FLUID DAMPER AND DRIVING TOOL

(71) Applicant: MAX CO., LTD., Tokyo (JP)

(72) Inventor: Hiroshi Tanaka, Tokyo (JP)

(73) Assignee: MAX CO., LTD., Tokyo (JP)

( * ) Notice: Subject to any disclaimer, the term of this patent is extended or adjusted under 35 U.S.C. 154(b) by 137 days.

(21) Appl. No.: 16/975,348

(22) PCT Filed: Feb. 27, 2019

(86) PCT No.: PCT/JP2019/007712
§ 371 (c)(1),
(2) Date: Aug. 24, 2020

(87) PCT Pub. No.: WO2019/168075
PCT Pub. Date: Sep. 6, 2019

(65) Prior Publication Data
US 2020/0391365 A1    Dec. 17, 2020

(30) Foreign Application Priority Data

Mar. 1, 2018 (JP) ............................. JP2018-036896

(51) Int. Cl.
*B25C 1/04* (2006.01)
*B25C 1/00* (2006.01)

(52) U.S. Cl.
CPC .............. *B25C 1/047* (2013.01); *B25C 1/008* (2013.01)

(58) Field of Classification Search
CPC ..... B25C 1/043; B25C 1/04–047; B25C 1/06; B25C 1/008
See application file for complete search history.

(56) References Cited

U.S. PATENT DOCUMENTS

| 3,803,840 A | 4/1974 | Toczycki |
| 4,509,668 A | 4/1985 | Klaus et al. |
| 5,772,096 A | 6/1998 | Osuka et al. |
| 2012/0247891 A1* | 10/2012 | Miyasato ............... F16F 9/483 188/288 |

(Continued)

FOREIGN PATENT DOCUMENTS

| DE | 2353248 A1 | 6/1974 |
| DE | 202009006233 U1 | 9/2010 |

(Continued)

OTHER PUBLICATIONS

International Search Report and Written Opinion issued for PCT Application No. PCT/JP2019/007712 dated May 28, 2019, 10 pages.

(Continued)

*Primary Examiner* — Anna K Kinsaul
*Assistant Examiner* — Veronica Martin
(74) *Attorney, Agent, or Firm* — Weihrouch IP

(57) ABSTRACT

A fluid damper includes a cylinder tube portion which is filled with a fluid, a piston which is provided so as to be movable in an inner portion of the cylinder tube portion and whose moving speed is controlled with resistance of the fluid, and a biasing member which expands and contracts in accordance with a position of the piston and which applies a force corresponding to an expansion and contraction amount of the biasing member to the piston. The resistance of the fluid at a time the piston moves is changed in accordance with the position of the piston.

16 Claims, 20 Drawing Sheets

(56) References Cited

U.S. PATENT DOCUMENTS

| | | | |
|---|---|---|---|
| 2016/0076618 A1* | 3/2016 | Svara | F16F 9/52 |
| | | | 188/316 |
| 2018/0117748 A1 | 5/2018 | Ishikawa et al. | |
| 2019/0022842 A1* | 1/2019 | Oouchi | B25C 1/047 |
| 2019/0389045 A1* | 12/2019 | Ishikawa | B25C 5/11 |

FOREIGN PATENT DOCUMENTS

| | | |
|---|---|---|
| EP | 0736360 A2 | 10/1996 |
| JP | S55-175647 U | 12/1980 |
| JP | S57-164335 U | 10/1982 |
| JP | H08-276375 A | 10/1996 |
| JP | H10-156753 A | 6/1998 |
| JP | 2016-179526 A | 10/2016 |
| WO | 2018/159491 A1 | 9/2018 |

OTHER PUBLICATIONS

Extended European Search Report dated Nov. 10, 2021, issued by the European Patent Office in the corresponding European Patent Application No. 19760964.7. (8 pages).

\* cited by examiner

FLUID DAMPER AND DRIVING TOOL

CROSS REFERENCE TO RELATED APPLICATION

This application is a 35 U.S.C. 371 National Phase Entry Application from PCT/JP2019/007712, filed Feb. 27, 2019, which claims priority to Japanese Patent Application No. 2018-036896, filed Mar. 1, 2018, the disclosures of which are incorporated herein in their entirety by reference, and priority is claimed to each of the foregoing.

TECHNICAL FIELD

The present invention relates to a fluid damper capable of performing clocking in a mechanical manner by controlling, with resistance of a fluid, a moving speed of an actuation object, and relates to a driving tool using the fluid damper.

BACKGROUND ART

There is known a driving tool referred to as a nailing machine in which a driving piston is actuated by a driving mechanism using a fluid such as compressed air as a power source, and in which a driver coupled to the driving piston is driven to drive a fastener such as a nail supplied to a nose. In such a nailing machine, the driving mechanism is actuated by operations of two members to drive a nail, which are one operation of pulling a trigger provided on a handle and another operation of pressing a contact arm, which protrudes at a tip end of the nose and is provided so as to be reciprocally movable, against an object.

In the following description, a state where the trigger is pulled by the one operation is referred to as "ON of the trigger", and a state where the one operation is released and the trigger is not pulled is referred to as "OFF of the trigger". In addition, a state where the contact arm is pressed by the other operation is referred to as "ON of the contact arm", and a state where the other operation is released and the contact arm is not pressed is referred to as "OFF of the contact arm".

In the nailing machine, for example, after the contact arm is set ON, the trigger is set ON with the contact arm being in the ON state, so that the driving mechanism is actuated to perform nail driving.

The trigger and the contact arm are set OFF after the nail driving, and the trigger and the contact arm are set ON again as described above, so that the driving mechanism is actuated to perform a next nail driving. An operation in which the trigger and the contact arm are set ON for each nail driving after being set OFF to perform the next nail driving as described is referred to as "a single driving mode".

In contrast, there has been proposed a technique in which the contact arm is set OFF after the nail driving with the trigger being in an ON state, and the contact arm is set ON again with the trigger being in the ON state, so that the driving mechanism is actuated to perform the next nail driving. An operation in which continuous nail driving is performed by repeating ON and OFF of the contact arm with the trigger being in the ON state as described is referred to as "a continuous driving mode".

In the continuous driving mode, the nail driving can be continuously performed each time the contact arm is pressed against the object after a nail driving with the trigger being pulled, and thus it is suitable for quick work. On the other hand, in the single driving mode, the operations of the trigger and the contact arm are released after a nail driving, and the trigger is pulled again after the contact arm is pressed against the object so as to perform the next nail driving; it is not suitable for quick work although an effect of regulating undesired operation is presented. Therefore, there has been proposed a technique in which, a continuous nail driving operation for a certain period of time is made possible only by the operation of pressing the contact arm against the object, with the operation of the trigger not released after a first nail driving is performed by pressing the contact arm against the object and then pulling the trigger (see, for example, Patent Literature 1).

CITATION LIST

Patent Literature

Patent Literature 1: JP-A-2016-179526

SUMMARY OF INVENTION

Technical Problem

In a configuration in which continuous driving of nails or the like can be performed only by the operation of pressing the contact arm against the object without releasing the operation of the trigger, control that enables the continuous driving operation for a certain period of time is performed using an electric timer, so that clocking can be stably performed. However, a nailing machine driven by compressed air does not include a supply source of electricity. Therefore, in order to use an electric timer, a power supply and a circuit are required.

Alternatively, a configuration is conceivable in which a mechanical clocking mechanism is incorporated into the trigger. However, it is necessary to incorporate the mechanical clocking mechanism in a limited space, and it is difficult to stably perform clocking. If the clocking cannot be performed stably, a period of time during which the continuous driving operation is possible is not constant, and the operation feeling gets worse.

It is conceivable to use various types of dampers, such as an oil damper, as the mechanical clocking mechanism. The oil damper is a configuration of applying a load to movement of the piston by resistance of oil, in which if the piston is moved by a force of a spring, time required for the movement can be used for clocking, by reducing a moving speed of the piston with the force of the spring and keeping the moving speed of the piston constant.

In such an oil damper, the spring expands and contracts in accordance with a position of the piston, and a force corresponding to an expansion and contraction amount is applied to the piston. Therefore, in a state where the force applied to the piston by the spring is weak and a force exceeding the viscous resistance of the oil is not applied to the piston, the piston cannot be moved at a constant speed. In a driving tool to which such an oil damper is applied as a clocking mechanism, it is difficult to stably perform the clocking, and the period of time during which the continuous driving operation is possible is not constant.

On the other hand, it is conceivable to prevent a change in the force applied to the piston by using a long spring with respect to a stroke of the piston, but when the length of the spring is increased, a size of the oil damper increases. Further, the driving tool to which such an oil damper is applied as a clocking mechanism is also increased in size.

The present invention has been made to solve these problems, and an object thereof is to provide a fluid damper that is capable of controlling the moving speed of the piston appropriately in accordance with the change in the force applied to the piston by the spring, and a driving tool that is capable of stably switching between presence and absence of performing of the continuous driving operation by the operation of the contact arm, with a mechanical configuration using the fluid damper.

Solution to Problem

In order to solve the problems described above, the present invention provides a fluid damper including: a cylinder tube portion which is filled with a fluid, a piston that is provided so as to be movable in an inner portion of the cylinder tube portion and whose moving speed is controlled with resistance of the fluid, and a biasing member which expands and contracts in accordance with a position of the piston and applies a force corresponding to an expansion and contraction amount of the biasing member to the piston, in which resistance of the fluid at a time the piston moves is changed.

In the present invention, the force applied to the piston by the biasing member changes in accordance with the position of the piston. By changing the resistance of the fluid at the time the piston moves in accordance with the change of the force applied to the piston by the biasing member, a load suitable for the force applied to the piston by the spring can be provided to the piston.

In addition, the present invention provides a driving tool. The driving tool includes a driving mechanism which is configured to drive a fastener supplied to a nose portion and which is configured to switch between presence and absence of actuation of the driving mechanism by using the fluid damper described above.

Further, the present invention provides a driving tool including: a driving mechanism which is configured to drive a fastener supplied to a nose portion, a trigger which is configured to receive one operation for actuating the driving mechanism, a contact arm which is provided so as to be reciprocally movable and which is configured to receive another operation for actuating the driving mechanism, a contact lever which is provided so as to be capable of being actuated by operations of the trigger and the contact arm and which is configured to switch between presence and absence of actuation of the driving mechanism, and a fluid damper which is configured to control a moving speed of the contact lever, in which the fluid damper includes a cylinder tube portion which is filled with a fluid, a piston which is provided so as to be movable in an inner portion of the cylinder tube portion and whose moving speed is controlled with resistance of the fluid, and a biasing member which is configured to expand and contract in accordance with a position of the piston and which is configured to apply a force corresponding to an expansion and contraction amount to the piston, and the resistance of the fluid at time the piston moves is changed in accordance with the position of the piston.

In the fluid damper of the present invention, the force applied to the piston by the biasing member changes in accordance with the position of the piston. By changing the resistance of the fluid at the time the piston moves in accordance with the change of the force applied to the piston by the biasing member, a load suitable for the force applied to the piston by the biasing member can be provided to the piston. Accordingly, the moving speed of the moving member can be appropriately controlled with the load applied due to the resistance of the fluid, with a configuration of moving the moving member by the force of the biasing member.

Advantageous Effects of Invention

In the fluid damper of the present invention, since a load suitable for the force applied to the piston by the biasing member can be provided to the piston, influence of the force applied to the piston by the biasing member can be eliminated, and the moving speed of the piston can be appropriately controlled.

In the driving tool of the present invention, since the fluid damper described above is provided, it is possible to stably perform the clocking with a mechanical clocking mechanism, and it is possible to switch between the presence and absence of the actuation of the driving mechanism at a predetermined timing.

DESCRIPTION OF EMBODIMENTS

Hereinafter, embodiments of an oil damper, which is an example of a fluid damper of the present invention, and a nailing machine, which is an example of a driving tool of the present invention, will be described with reference to the drawings.

Configuration Example of Nailing Machine of First Embodiment

Figure 1:
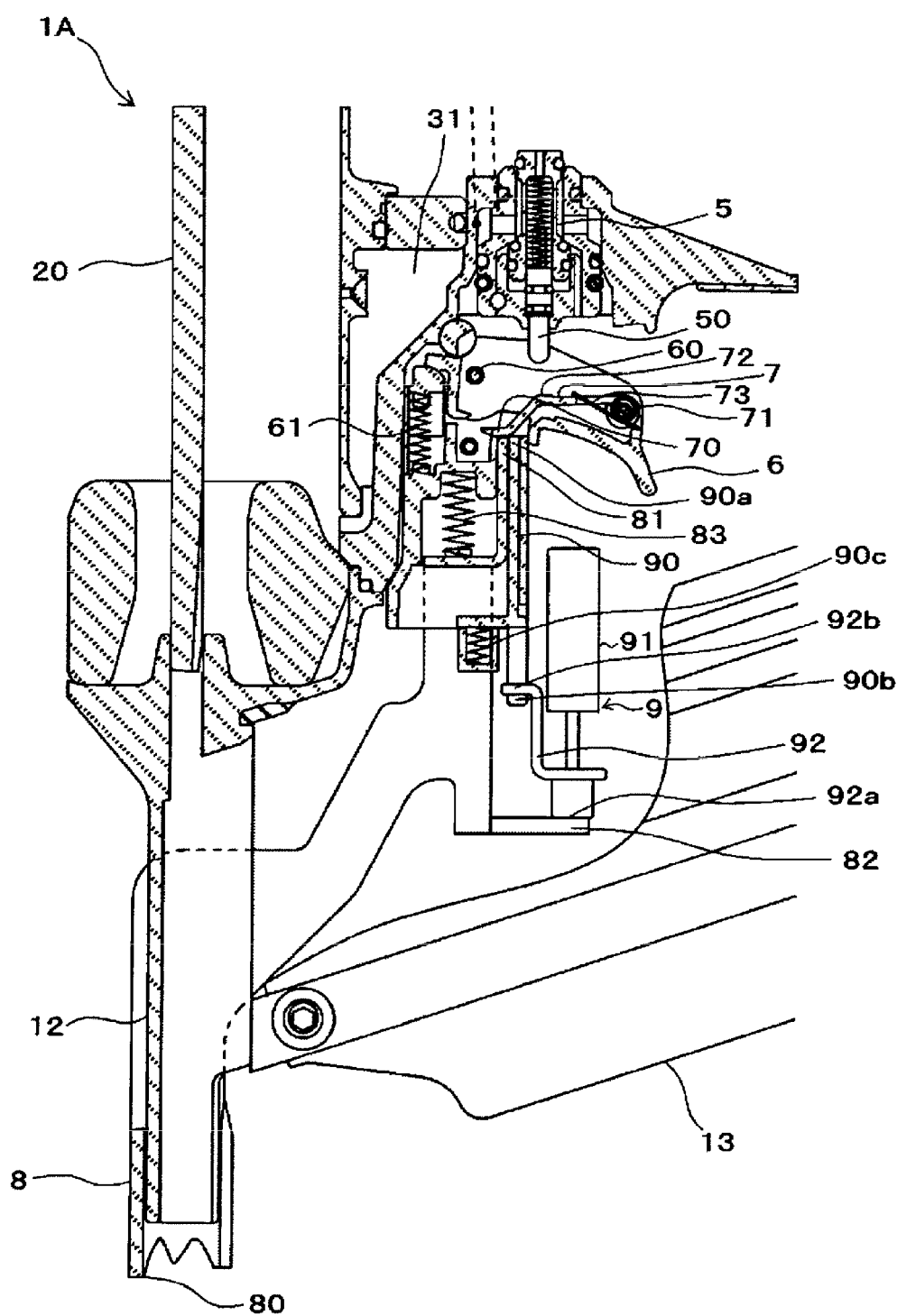
FIG. 1 is a main part configuration diagram illustrating an example of a nailing machine according to a first embodiment.
Figure 2:
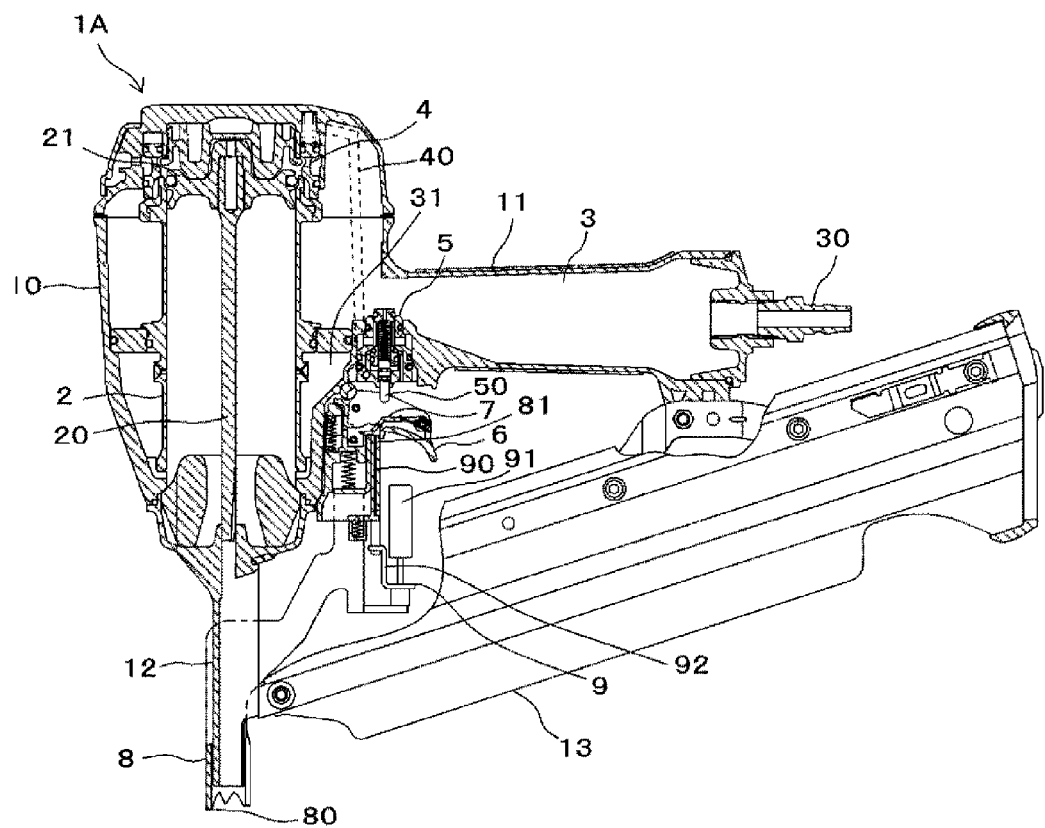
FIG. 2 is an overall configuration diagram illustrating the example of the nailing machine according to the first embodiment.

FIG. 1 is a main part configuration diagram illustrating an example of a nailing machine according to a first embodiment. FIG. 2 is an overall configuration diagram illustrating the example of the nailing machine of the first embodiment.

A nailing machine 1A according to the first embodiment includes a driving cylinder 2 that is actuated with compressed air serving as a fluid, which is a power source, to perform a striking operation, and an air chamber 3 in which compressed air supplied from an external air compressor (not illustrated) is stored. In the nailing machine 1A, the driving cylinder 2 is provided in an inner portion of a housing 10 having a shape extending in one direction, and the air chamber 3 is provided in an inner portion of a handle 11 extending from the housing 10 in another direction. In addition, in the nailing machine 1A, a blowback chamber 31 is provided around a lower portion of the driving cylinder 2 at the inner portion of the housing 10.

The driving cylinder 2, which is an example of a driving mechanism, includes a driver 20 drives a nail or the like (not illustrated), and a driving piston 21 provided with the driver 20. The driving piston 21 is slidably provided. In the driving cylinder 2, the driving piston 21 is moved by being pushed with compressed air to drive the driver 20.

The compressed air is supplied to the air chamber 3 from a compressed air source such as an air compressor through an air plug 30 provided at an end portion of the handle 11. The blowback chamber 31 is supplied with compressed air to drive and return the driving piston 21 after a driving operation to an initial position.

The nailing machine 1A includes, at one end portion of the housing 10, a nose 12 into which the driver 20 enters, and a magazine 13 that supplies a nail (not illustrated) to the nose 12. The nose 12 extends along a moving direction of the driver 20. In consideration of a use form of the nailing machine 1A, a side at which the nose 12 is provided is referred to as a lower direction.

The nailing machine 1A includes a main valve 4 that regulates inflow and outflow of compressed air in the air chamber 3 to cause the driving piston 21 to reciprocate, and a actuating valve 5 that actuates the main valve 4. The main valve 4 switches between inflow of compressed air from the air chamber 3 into the driving cylinder 2 and discharge of the compressed air from inside the driving cylinder 2 to an outside, so that the driving piston 21 is caused to reciprocate. The actuating valve 5 includes a valve stem 50 that is provided so as to be reciprocally movable, and the valve stem 50 is moved by a predetermined amount to open a flow path 40 to actuate the main valve 4.

The nailing machine 1A includes a trigger 6 that receives one operation for actuating the actuating valve 5, a contact arm 8 that moves in response to another operation to be pressed against an object to which a nail is hit, and a contact lever 7. The contact lever 7 is provided so as to be capable of being actuated by an operation of the trigger 6 having received the one operation and by an operation of the contact arm 8 having received the other operation, and switches between presence and absence of actuation of the actuating valve 5. Further, the nailing machine 1A includes a regulating part 9 that regulates movement, a moving speed, or a movement amount of the contact lever 7 for a predetermined period of time, and that switches between presence and absence of actuation of the contact lever 7 depending on the contact arm 8, according to presence or absence of engagement between the contact lever 7 and the contact arm 8 in this example.

The trigger 6 is provided on one side of the handle 11 which is a side where the nose 12 is provided. One end portion side of the trigger 6, which is a side close to the housing 10, is rotatably supported by a shaft 60. Further, a side opposite the side supported by the shaft 60, that is, the other end portion side of the trigger 6 which is a side far from the housing 10, is biased by a spring 61 in a direction of moving toward a side where the nose 12 is provided, by a rotation operation using the shaft 60 as a fulcrum.

In this example, a moving range of the trigger 6 by the rotation operation using the shaft 60 as a fulcrum is regulated by bringing the trigger 6 abutting against an abutting portion formed in the housing 10 and the handle 11.

The contact lever 7 includes, at one end portion thereof, an engaging portion 70 with which the contact arm 8 can engage, and the other end portion thereof is rotatably supported by a shaft 71 on the trigger 6. A pushing portion 72 capable of pushing the valve stem 50 of the actuating valve 5 is provided between the engaging portion 70 and the shaft 71. Further, a side opposite the side supported by the shaft 71, that is, the one end portion side of the contact lever 7 where the engaging portion 70 is provided, is biased by a spring 73 such as a torsion coil spring in a direction of moving toward a side where the nose 12 is provided, by a rotation operation using the shaft 71 as a fulcrum.

The contact arm 8 is provided so as to be movable along an extension direction of the nose 12, and includes an abutting portion 80 that abuts against an object at a tip end side of the nose 12. In addition, the contact arm 8 includes a first pushing portion 81 that actuates the contact lever 7, and a second pushing portion 82 that actuates the regulating part 9. The contact arm 8 is biased by a spring 83 in a direction of protruding from the tip end side of the nose 12.

In a state where an operation is released, the trigger 6 is biased by the spring 61 to move to an initial position thereof by the rotation operation using the shaft 60 as a fulcrum. The trigger 6 is moved, by the rotation operation using the shaft 60 as a fulcrum according to a pulling operation, from the initial position to an operating position thereof where the actuating valve 5 can be actuated by the contact lever 7.

When pushed by the contact arm 8, the contact lever 7 is moved, by the rotation operation using the shaft 71 as a fulcrum, from an initial position thereof to a position where the driving cylinder 2 can be actuated in accordance with the position of the trigger 6, that is, to an actuation possible position in this example where the valve stem 50 can be pushed to actuate the actuating valve 5.

When the abutting portion 80 is pushed by being abutted against the object, the contact arm 8 moves from an initial position thereof to an actuating position thereof where the contact lever 7 is actuated by the first pushing portion 81 and the regulating part 9 is actuated by the second pushing portion 82.

When the first pushing portion 81 engages with the engaging portion 70 of the contact lever 7 by an operation of moving the contact arm 8 from the initial position thereof to the actuating position thereof, the contact lever 7 is actuated by the operation of the contact arm 8, and the contact lever 7 is moved from the initial position thereof to the actuation possible position thereof. In addition, with respect to the contact arm 8, the presence or absence of engagement between the engaging portion 70 of the contact lever 7 and the first pushing portion 81 of the contact arm 8 is switched in accordance with the position of the trigger 6 and the position of the contact lever 7.

That is, when the trigger 6 is operated, the contact lever 7 moves together with the trigger 6 by the rotation operation of the trigger 6 using the shaft 60 as a fulcrum. Accordingly, the initial position and the actuation possible position of the contact lever 7 are relative positions that change in accordance with the position of the trigger 6, and the positions of the engaging portion 70 and the pushing portion 72 of the contact lever 7 vary depending on whether the trigger 6 is in the initial position thereof or the operating position thereof.

In a state where the trigger 6 and the contact lever 7 are moved to respective initial positions, the pushing portion 72 of the contact lever 7 does not contact the valve stem 50 of the actuating valve 5. In addition, in a state where the contact lever 7 is moved to the initial position thereof, the pushing portion 72 of the contact lever 7 does not contact the valve stem 50 of the actuating valve 5 even if the trigger 6 moves to the operating position thereof.

In contrast, when the contact arm 8 moves to the actuating position thereof in a state where the trigger 6 is moved to the initial position thereof, the first pushing portion 81 of the contact arm 8 engages with the engaging portion 70 of the contact lever 7, and the contact lever 7 moves to the actuation possible position thereof. Accordingly, when the trigger 6 moves to the operating position thereof, the pushing portion 72 of the contact lever 7 can push the valve stem 50 of the actuating valve 5, and the actuating valve 5 can be actuated by the contact lever 7.

On the other hand, when the trigger 6 moves to the operating position thereof in a state where the contact arm 8 is moved to the initial position thereof, the first pushing portion 81 cannot engage with the engaging portion 70 of the contact lever 7 even if the contact arm 8 moves, and the pushing portion 72 of the contact lever 7 cannot push the valve stem 50 of the actuating valve 5 even if the trigger 6 moves to the operating position thereof.

Accordingly, even if the trigger 6 is operated first and the contact arm 8 is operated next, the actuating valve 5 cannot be actuated, and continuous driving by an operation of pushing the contact arm 8 against an object cannot be performed. In the present embodiment, since the regulating part 9 is provided, when the contact arm 8 is operated first and the trigger 6 is operated next, the continuous driving can be performed with the presence or absence of the operation of the contact arm 8 for a predetermined period of time.

The regulating part 9 includes a regulating member 90 that regulates a position of the contact lever 7 to an actuation standby position where the contact lever 7 can be actuated by the contact arm 8. In addition, the regulating part 9 includes an oil damper 91 that maintains a state for a predetermined period of time where the contact lever 7 is in the actuation standby position.

The actuation standby position of the contact lever 7 is a position or a range where the contact lever 7 can engage with the contact arm 8, and the contact lever 7 can be actuated by the contact arm 8 while the contact lever 7 is in this position or range. In the following description, the actuation standby position is referred to as an engagement possible position.

The regulating member 90 is provided so as to be movable along a moving direction of the contact arm 8, and includes, at one end portion along the moving direction, a pushing portion 90a that pushes the contact lever 7. The regulating member 90 is provided with the pushing portion 90a thereof adjacent to the first pushing portion 81 of the contact arm 8. In addition, the regulating member 90 includes an engaged portion 90b that can engage with the oil damper 91.

The regulating member 90 is biased by a spring 90c in a direction in which the pushing portion 90a approaches the contact lever 7.

Further, the regulating member 90 moves from an initial position thereof where the pushing portion 90a does not contact the contact lever 7 to a return regulating position for regulating the position of the contact lever 7 to an engagement possible position where the contact lever 7 and the contact arm 8 can engage with each other. The return regulating position of the regulating member 90 is a position where, by an operation of that the regulating member 90 moves by being pushed by the spring 90c, the pushing portion 90a protrudes relative to the first pushing portion 81 and the pushing portion 90a can contact the engaging portion 70 of the contact lever 7 in a state where the contact arm 8 is moved to the initial position thereof.

The oil damper 91 includes a moving member 92 that moves the regulating member 90, and controls movement, a moving speed, or a movement amount of the moving member 92. In this example, the oil damper 91 controls the moving speed of the moving member 92. The moving member 92 is provided so as to be movable along a moving direction of the regulating member 90, and includes a pushed portion 92a that is pushed by the second pushing portion 82 of the contact arm 8 and an engaging portion 92b that engages with the engaged portion 90b of the regulating member 90.

The oil damper 91 is provided with the pushed portion 92a of the moving member 92 in a moving path of the second pushing portion 82 of the contact arm 8 that moves from the initial position thereof to the actuating position thereof. The moving member 92 moves from an initial position thereof where the regulating member 90 is moved to the initial position thereof, to a clocking starting position for starting measuring a time period during which the movement of the contact lever 7 moved to the engagement possible position thereof after an operation of the contact arm 8 is released is regulated, that is, a time period until the regulating member 90, which is moved to the return regulating position, moving to the initial position thereof in this example.

The regulating member 90 is provided with the engaged portion 90b in a moving path of the engaging portion 92b which is formed due to the movement of the moving member 92. By an operation of moving the moving member 92 of the oil damper 91 from the initial position thereof to the clocking starting position thereof, the engagement between the engaging portion 92b of the moving member 92 and the engaged portion 90b of the regulating member 90 is released. Accordingly, the regulating member 90 is pushed by the spring 90c to move from the initial position thereof to the return regulating position thereof.

In addition, by an operation of moving the moving member 92 of the oil damper 91 from the clocking starting position thereof to the initial position thereof, the engaging portion 92b of the moving member 92 and the engaged portion 90b of the regulating member 90 engage with each other. Accordingly, the regulating member 90 moves from the return regulating position thereof to the initial position thereof.

Configuration Example of Oil Damper of First Embodiment

Figure 3:
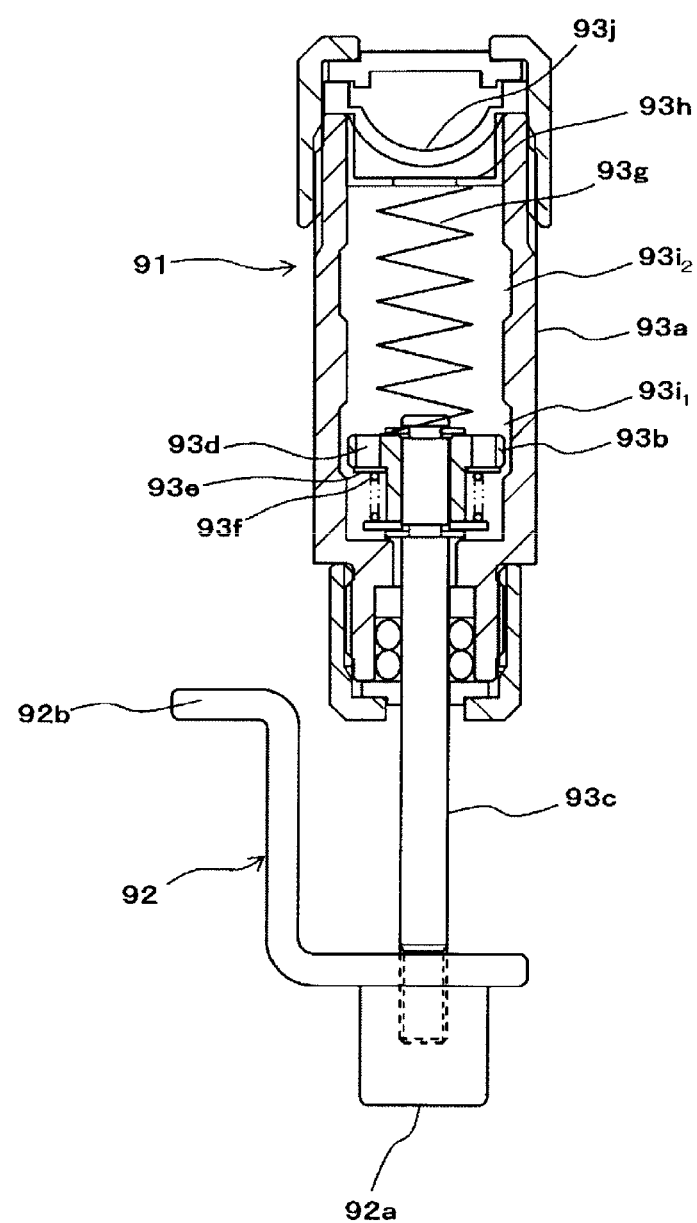
FIG. 3 is a cross-sectional view illustrating an oil damper according to the first embodiment.

FIG. 3 is a cross-sectional view of the oil damper according to the first embodiment. The oil damper 91 of the first embodiment includes a cylinder tube portion 93a that is filled with oil, a piston 93b that is provided so as to be movable in an inner portion of the cylinder tube portion 93a and whose moving speed is controlled with resistance due to viscosity or the like of oil, and a piston shaft portion 93c that transmits movement of the piston 93b to the moving member 92.

The cylinder tube portion 93a is provided with a space that is defined in a substantially cylindrical shape and that is filled with oil. The piston 93b has a circular shape conforming to a shape of an inner circumferential surface of the cylinder tube portion 93a, and a hole portion 93d through which the oil passes is provided so as to penetrate both sides of the piston 93b. In this example, a plurality of hole portions 93d are provided along a circumferential direction of the piston 93b. One end portion of the piston shaft portion 93c is attached to the piston 93b, and the other end portion thereof protruding from the cylinder tube portion 93a is coupled to the moving member 92.

The oil damper 91 includes a check valve 93e that switches a load in accordance with a direction, in which the piston 93b moves, by opening and closing the hole portions 93d in accordance with the direction in which the piston 93b moves. The check valve 93e is provided on one surface of the piston 93b which is a side where the piston shaft portion 93c protrudes in the piston 93b, and has a shape capable of blocking the hole portions 93d. The check valve 93e is movable in a direction of separating from the piston 93b along the moving direction of the piston 93b, and is biased by a valve opening and closing spring 93f in a direction to be pushed against the piston 93b.

In an operation of moving the piston 93b in a direction in which the moving member 92 moves from the initial position thereof toward the clocking starting position thereof, the oil flows from the other surface toward the one surface side of the piston 93b. Accordingly, the check valve 93e is pushed by the oil passing through the hole portions 93d, so that the check valve 93e is separated from the one surface of the piston 93b while compressing the valve opening and closing spring 93f and the hole portions 93d are opened.

In contrast, in an operation of moving the piston 93b in a direction in which the moving member 92 moves from the clocking starting position thereof toward the initial position thereof, the oil flows from the one surface toward the other surface side of the piston 93b. Accordingly, the check valve 93e is pushed against the piston 93b by being pushed by the valve opening and closing spring 93f and the oil, and the hole portions 93d are closed by the check valve 93e.

As described, by opening and closing the hole portions 93d of the piston 93b with the check valve 93e, area of a flow path through which the oil flows when the piston 93b moves is changed. When the hole portions 93d are opened, the area of the flow path through which the oil flows when the piston 93b moves is increased, and resistance at the time the oil flows decreases. In contrast, when the hole portions 93d are closed, the area of the flow path through which the oil flows when the piston 93b moves is reduced, and the resistance at the time the oil flows increases.

The oil damper 91 includes a spring 93g that expands and contracts in accordance with a position of the piston 93b and that applies a force corresponding to an expansion and contraction amount to the piston 93b. The spring 93g is an example of a biasing member, is configured with a coil spring, and is provided between a spring retainer 93h provided in the inner portion of the cylinder tube portion 93a and the other surface of the piston 93b.

In a state where the moving member 92 is moved to the initial position thereof, the spring 93g is compressed by a predetermined amount and biases the piston 93b in a direction in which the piston shaft portion 93c protrudes from the cylinder tube portion 93a. The direction in which the piston shaft portion 93c protrudes from the cylinder tube portion 93a is a direction in which the moving member 92 moves from the clocking starting position thereof toward the initial position thereof.

In the operation of moving the piston 93b in the direction in which the moving member 92 moves from the initial position thereof toward the clocking starting position thereof, the spring 93g is compressed between the spring retainer 93h and the piston 93b. With a force to extend of the compressed spring 93g, the piston 93b is pushed in the direction in which the moving member 92 moves from the clocking starting position thereof toward the initial position thereof.

The oil damper 91 includes a first bypass flow path $93i_1$ and a second bypass flow path $93i_2$ that reduce the load at the time the piston 93b moves. The first bypass flow path $93i_1$ is an example of a flow path expanded portion, and is provided to face a position of the piston 93b that is in a state where the moving member 92 is moved to the vicinity of the initial position thereof, which is a terminal position of a movement range of the piston 93b that is moved by a force applied by the spring 93g. The first bypass flow path $93i_1$ is formed by providing a recess on the inner circumferential surface of the cylinder tube portion 93a. In the cylinder tube portion 93a, an inner diameter thereof at a portion where the first bypass flow path $93i_1$ is provided is larger than an inner diameter thereof at a portion where the first bypass flow path $93i_1$ is not provided.

Accordingly, in a state where the piston 93b faces the first bypass flow path $93i_1$, a gap between an outer circumferential surface of the piston 93b and the inner circumferential surface of the cylinder tube portion 93a is increased, as compared with a case where the piston 93b faces the inner circumferential surface of the cylinder tube portion 93a at a portion where the first bypass flow path $93i_1$ is not provided.

Therefore, when the moving member 92 moves between the initial position thereof and the clocking starting position and the piston 93b moves to a position that is not facing the first bypass flow path $93i_1$, the area of the flow path through which the oil flows when the piston 93b moves is reduced. Therefore, in an operation of moving the piston 93b, the resistance at the time the oil flows between the outer circumferential surface of the piston 93b and the inner circumferential surface of the cylinder tube portion 93a increases, and the load applied when the piston 93b moves increases.

In contrast, when the piston 93$b$ is moved to a position facing the first bypass flow path 93$i_1$ by moving the moving member 92 to the vicinity of the initial position thereof, the area of the flow path through which the oil flows when the piston 93$b$ moves is increased. Therefore, in an operation of moving the piston 93$b$, the resistance at the time the oil flows between the outer circumferential surface of the piston 93$b$ and the inner circumferential surface of the cylinder tube portion 93$a$ is reduced, and the load applied when the piston 93$b$ moves is reduced.

The second bypass flow path 93$i_2$ is an example of a flow path expanded portion, and is provided to face a position of the piston 93$b$ that is in a state where the moving member 92 is moved to the vicinity of the clocking starting position thereof. The second bypass flow path 93$i_2$ is formed by providing a recess on the inner circumferential surface of the cylinder tube portion 93$a$. In the cylinder tube portion 93$a$, an inner diameter thereof at a portion where the second bypass flow path 93$i_2$ is provided is larger than an inner diameter thereof at a portion where the second bypass flow path 93$i_2$ is not provided.

Accordingly, in a state where the piston 93$b$ faces the second bypass flow path 93$i_2$, a gap between an outer circumferential surface of the piston 93$b$ and the inner circumferential surface of the cylinder tube portion 93$a$ is widened, as compared with a case where the piston 93$b$ faces the inner circumferential surface of the cylinder tube portion 93$a$ at a portion where the second bypass flow path 93$i_2$ is not provided.

Therefore, when the piston 93$b$ is moved to a position facing the second bypass flow path 93$i_2$ by moving the moving member 92 to the vicinity of the clocking starting position thereof, the area of the flow path through which the oil passes when the piston 93$b$ moves is increased. Therefore, in the operation of moving the piston 93$b$, the resistance at the time the oil flows between the outer circumferential surface of the piston 93$b$ and the inner circumferential surface of the cylinder tube portion 93$a$ is reduced, and the load applied when the piston 93$b$ moves is reduced.

The oil damper 91 includes a diaphragm 93$j$ that keeps a volume in the cylinder tube portion 93$a$ substantially constant regardless of the position of the piston 93$b$. The diaphragm 93$j$ is configured with an elastically deformable member and is provided on the other end portion side of the cylinder tube portion 93$a$.

In the oil damper 91, since a length of the piston shaft portion 93$c$ protruding into the cylinder tube portion 93$a$ changes in accordance with the position of the piston 93$b$, a volume of the piston shaft portion 93$c$ and the volume in the cylinder tube portion 93$a$ change. Accordingly, by deforming the diaphragm 93$j$ in accordance with the length of the piston shaft portion 93$c$ protruding into the cylinder tube portion 93$a$, the volume in the cylinder tube portion 93$a$ is kept substantially constant, and the oil is prevented from being compressed.

In the oil damper 91 configured as described above, the moving member 92 moves from the clocking starting position thereof to the initial position thereof by the force to extend of the spring 93$g$, and the moving speed of the moving member 92 is controlled with the load applied when the piston 93$b$ moves in the cylinder tube portion 93$a$ due to the viscosity of the oil. In addition, when the moving member 92 moves to the vicinity of the initial position thereof by the force to extend of the spring 93$g$, the piston 93$b$ moves to the position facing the first bypass flow path 93$i_1$, the resistance at the time the oil flows between the outer circumferential surface of the piston 93$b$ and the inner circumferential surface of the cylinder tube portion 93$a$ is reduced, and the load applied to the piston 93$b$ when the moving member 92 moves toward the initial position thereof is reduced.

Accordingly, a time period during which the moving member 92 moves from the clocking starting position thereof to the initial position thereof is controlled, and a time period during which the regulating member 90 moves from the return regulating position thereof to the initial position thereof is controlled. Therefore, with respect to the contact lever 7 having moved to the engagement possible position thereof by an operation of moving the contact arm 8 toward the initial position thereof, a time period until returning to the initial position thereof is controlled by operations of the regulating member 90 and the moving member 92.

Operation Example of Nailing Machine of First Embodiment

FIGS. 4 to 9 are illustrative diagrams illustrating examples of operations of the nailing machine according to the first embodiment, and FIGS. 10 to 14 are illustrative diagrams illustrating examples of operations of the oil damper according to the first embodiment. The operations of the nailing machine 1A according to the first embodiment will be described below with reference to the drawings.

In an initial state, as illustrated in FIG. 1, the trigger 6 is not pulled and is in the initial position thereof, and the contact arm 8 is not pressed against the object and is in the initial position thereof. Therefore, the contact lever 7, the regulating member 90, and the moving member 92 are also in respective initial positions.

In an initial state where the trigger 6 is in the initial position thereof and the contact lever 7 is in the initial position thereof, the engaging portion 70 of the contact lever 7 is positioned in a moving path of the first pushing portion 81 of the contact arm 8.

Figure 4:
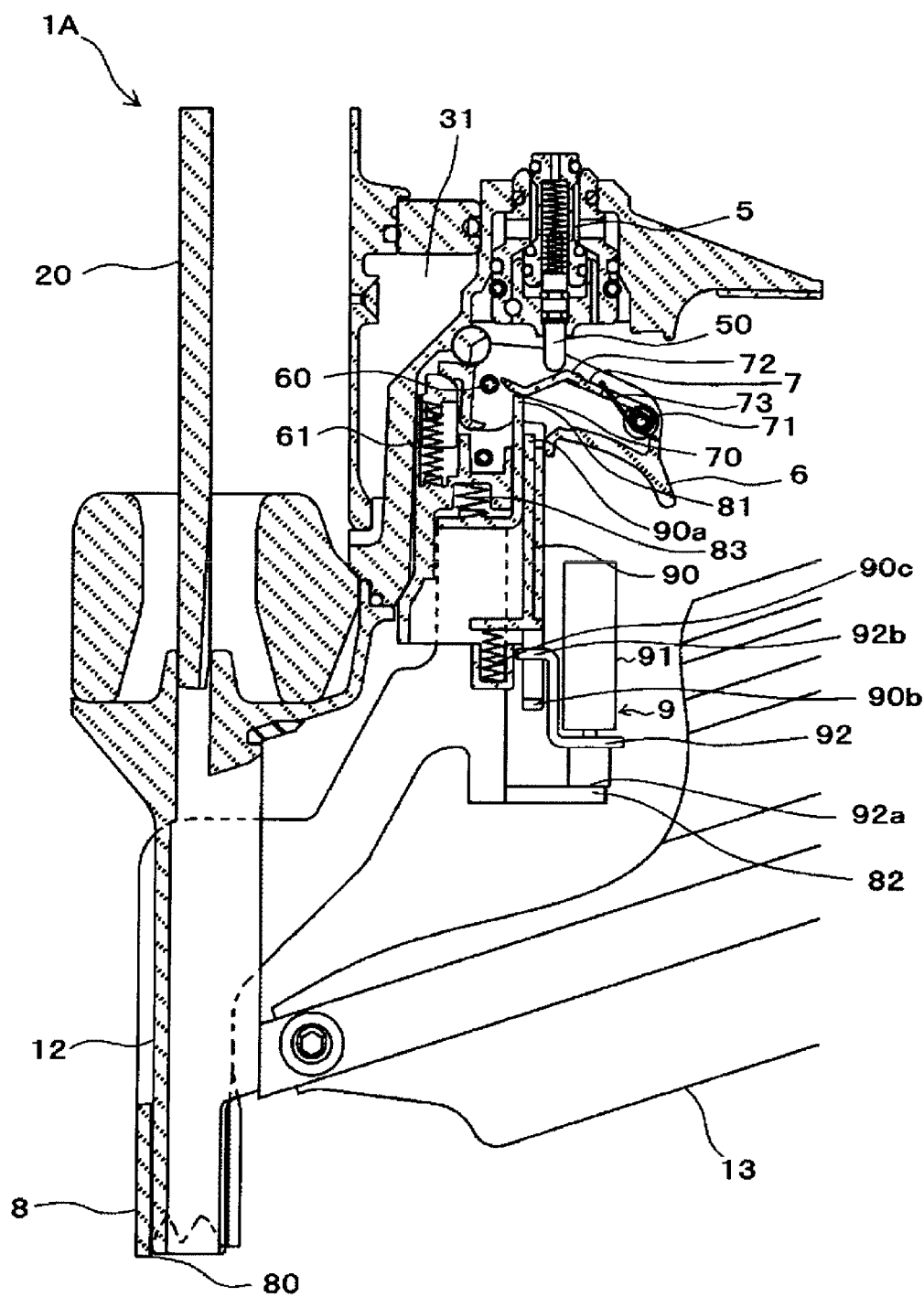
FIG. 4 is an illustrative diagram illustrating an example of an operation of the nailing machine according to the first embodiment.

When the contact arm 8 moves from the initial position thereof to the actuating position thereof by being pressed against the object, starting from the initial state illustrated in FIG. 1, the first pushing portion 81 of the contact arm 8 pushes the engaging portion 70 of the contact lever 7 as illustrated in FIG. 4. Accordingly, by the rotation operation using the shaft 71 as a fulcrum, the contact lever 7 moves from the initial position thereof to the actuation possible position thereof where the valve stem 50 of the actuating valve 5 can be pushed to actuate the actuating valve 5. Not that even if the contact lever 7 moves to the actuation possible position thereof, the valve stem 50 cannot be pushed by the contact lever 7 unless the trigger 6 moves to the operating position thereof.

When the contact arm 8 moves to the actuating position thereof, the second pushing portion 82 of the contact arm 8 pushes the pushed portion 92$a$ of the moving member 92 of the oil damper 91. Accordingly, the moving member 92 of the oil damper 91 moves from the initial position thereof to the clocking starting position thereof.

Further, when the moving member 92 moves to the clocking starting position thereof, the engagement between the engaging portion 92$b$ of the moving member 92 and the engaged portion 90$b$ of the regulating member 90 is released, and the regulating member 90 is pushed by the spring 90$c$ to move from the initial position thereof to the return regulating position thereof.

Figure 10:
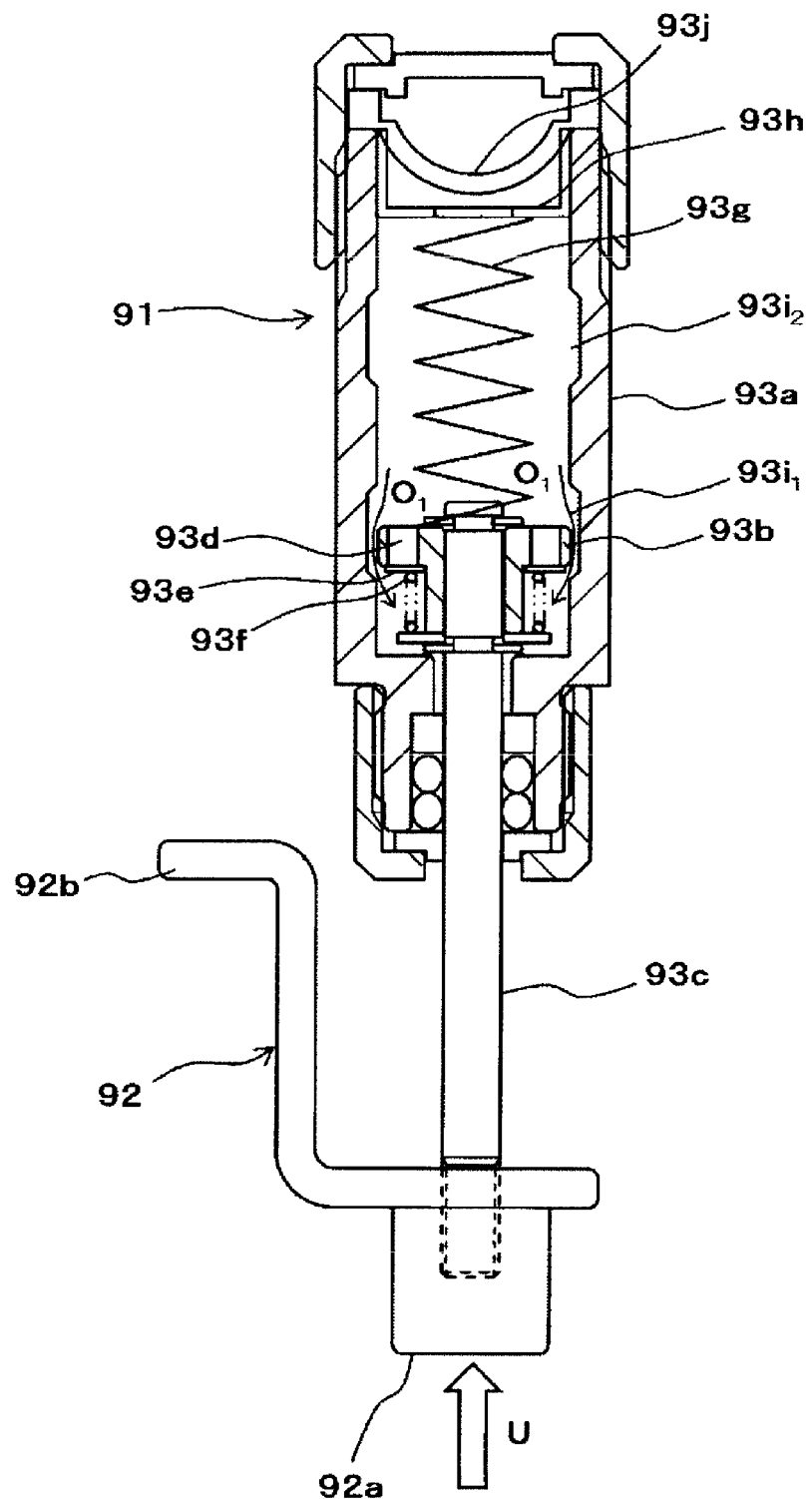
FIG. 10 is an illustrative diagram illustrating an example of an operation of the oil damper according to the first embodiment.

In addition, when the moving member 92 is moved to the initial position thereof, the piston 93$b$ faces the first bypass flow path 93$i_1$ in the oil damper 91, as illustrated in FIG. 10.

Accordingly, while the moving member 92 is positioned in the vicinity of the initial position thereof in the operation of moving the piston 93b in the direction in which the moving member 92 moves from the initial position thereof toward the clocking starting position thereof as indicated by an arrow U, the resistance at the time the oil flows as indicated by an arrow $O_1$ between the outer circumferential surface of the piston 93b and the inner circumferential surface of the cylinder tube portion 93a is reduced and the load applied when the piston 93b moves is reduced.

Further, in the operation that the piston 93b moves in the direction in which the moving member 92 moves from the initial position thereof to the clocking starting position thereof, the oil flows from the other surface to the one surface side of the piston 93b.

Accordingly, the check valve 93e is pushed by the oil passing through the hole portions 93d, so that the check valve 93e is separated from the one surface of the piston 93b while compressing the valve opening and closing spring 93f and the hole portions 93d are opened.

Figure 11:
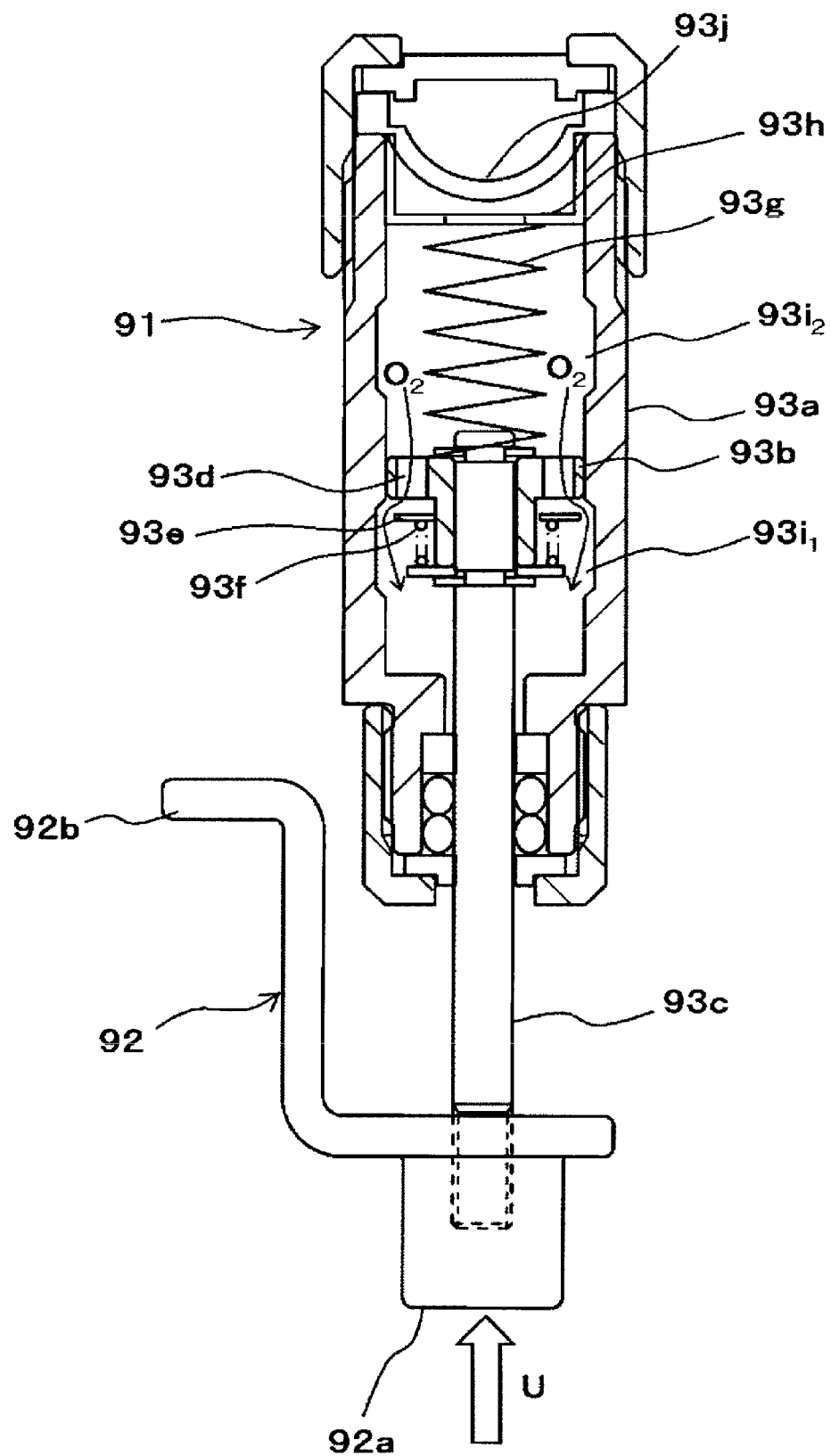
FIG. 11 is an illustrative diagram illustrating an example of an operation of the oil damper according to the first embodiment.

When the piston 93b passes past the position facing the first bypass flow path $93i_1$ as illustrated in FIG. 11 in the operation of moving the moving member 92 from the initial position thereof to the clocking starting position thereof, the gap between the outer circumferential surface of the piston 93b and the inner circumferential surface of the cylinder tube portion 93a is narrowed. On the other hand, when the hole portions 93d of the piston 93b are opened, the oil flows from the other surface, through the hole portions 93d, to the one surface side of the piston 93b as indicated by an arrow 02. Accordingly, the load applied when the piston 93b moves is reduced.

Since the piston 93b is pushed by the contact arm 8 via the moving member 92, an operating load of the contact arm 8 is reduced when the load applied at the time the piston 93b moves is reduced.

Figure 12:
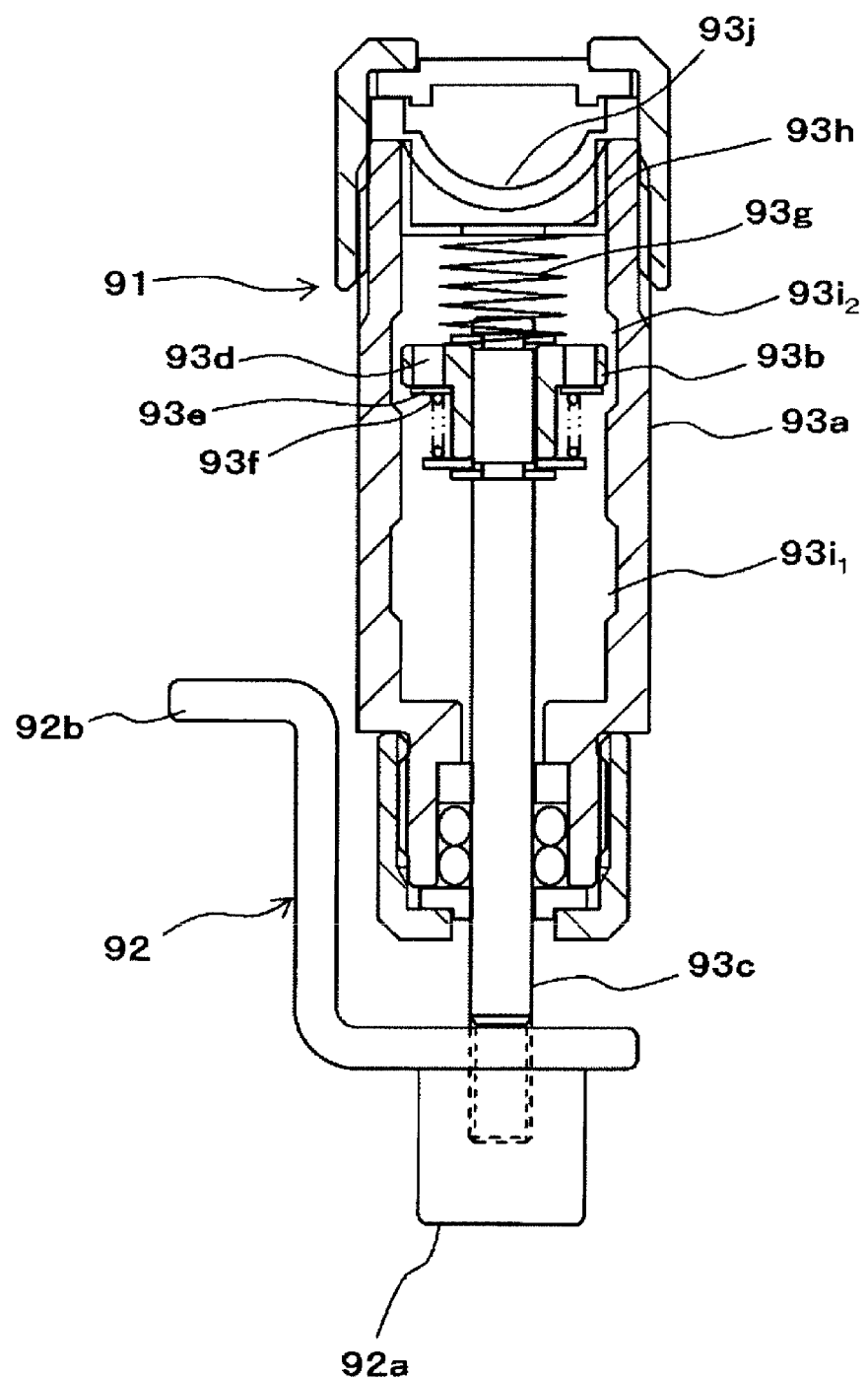
FIG. 12 is an illustrative diagram illustrating an example of an operation of the oil damper according to the first embodiment.

In addition, when the moving member 92 moves to the vicinity of the clocking starting position thereof, the piston 93b faces the second bypass flow path $93i_2$ as illustrated in FIG. 12. Accordingly, in the operation of moving the piston 93b in the direction in which the moving member 92 moves from the initial position thereof to the clocking starting position thereof, the resistance at the time the oil flows between the outer circumferential surface of the piston 93b and the inner circumferential surface of the cylinder tube portion 93a is reduced and the load applied when the piston 93b moves is reduced.

In a state where the moving member 92 is moved to the vicinity of the clocking starting position thereof, a compression amount of the spring 93g is increased, and a reaction force thereof to return the piston 93b is increased. In this state, since the load applied when the piston 93b moves is reduced, the operating load of the contact arm 8 is reduced.

When the moving member 92 moves to the vicinity of the clocking starting position and stops, the check valve 93e is pushed against the piston 93b by being pushed by the valve opening and closing spring 93f, and the hole portions 93d are blocked by the check valve 93e.

Figure 5:
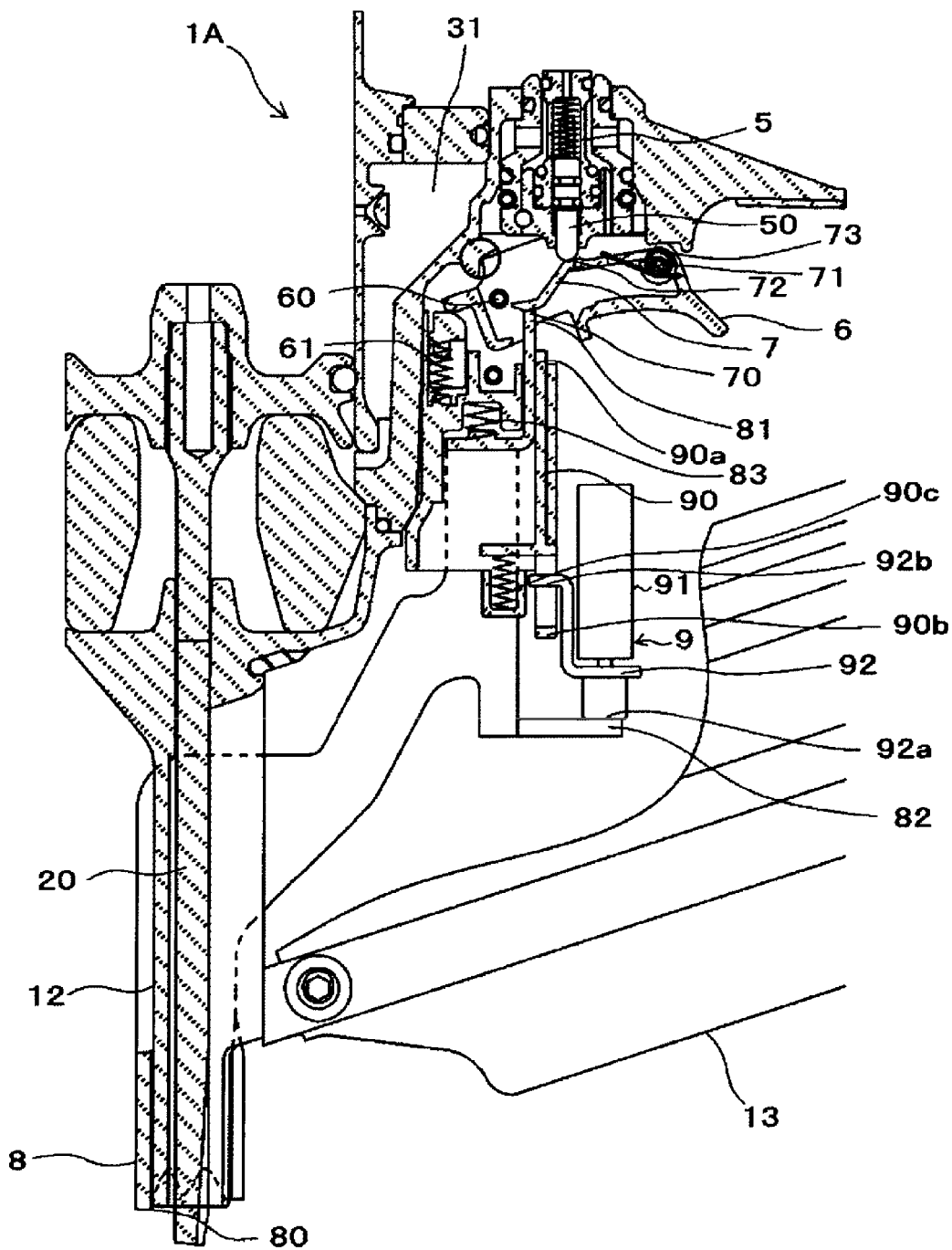
FIG. 5 is an illustrative diagram illustrating an example of an operation of the nailing machine according to the first embodiment.

When the trigger 6 is pulled to be moved from the initial position thereof to the operating position thereof after the contact arm 8 moves to the actuating position thereof by being pressed against the object from the initial state, as illustrated in FIG. 5, the pushing portion 72 of the contact lever 7 in the actuation possible position thereof pushes the valve stem 50 of the actuating valve 5. Accordingly, the main valve 4 is controlled to actuate the driving cylinder 2 with compressed air, the driving piston 21 moves in a direction in which a fastener (not illustrated), which is a nail in this example, is driven, and a driving operation of the nail (not illustrated) is performed with the driver 20. In addition, a part of the air in the driving cylinder 2 is supplied to the blowback chamber 31. After the driving operation, the compressed air is supplied from the blowback chamber 31 to the driving cylinder 2, and the driving piston 21 moves in a direction in which the driver 20 is returned.

Figure 6:
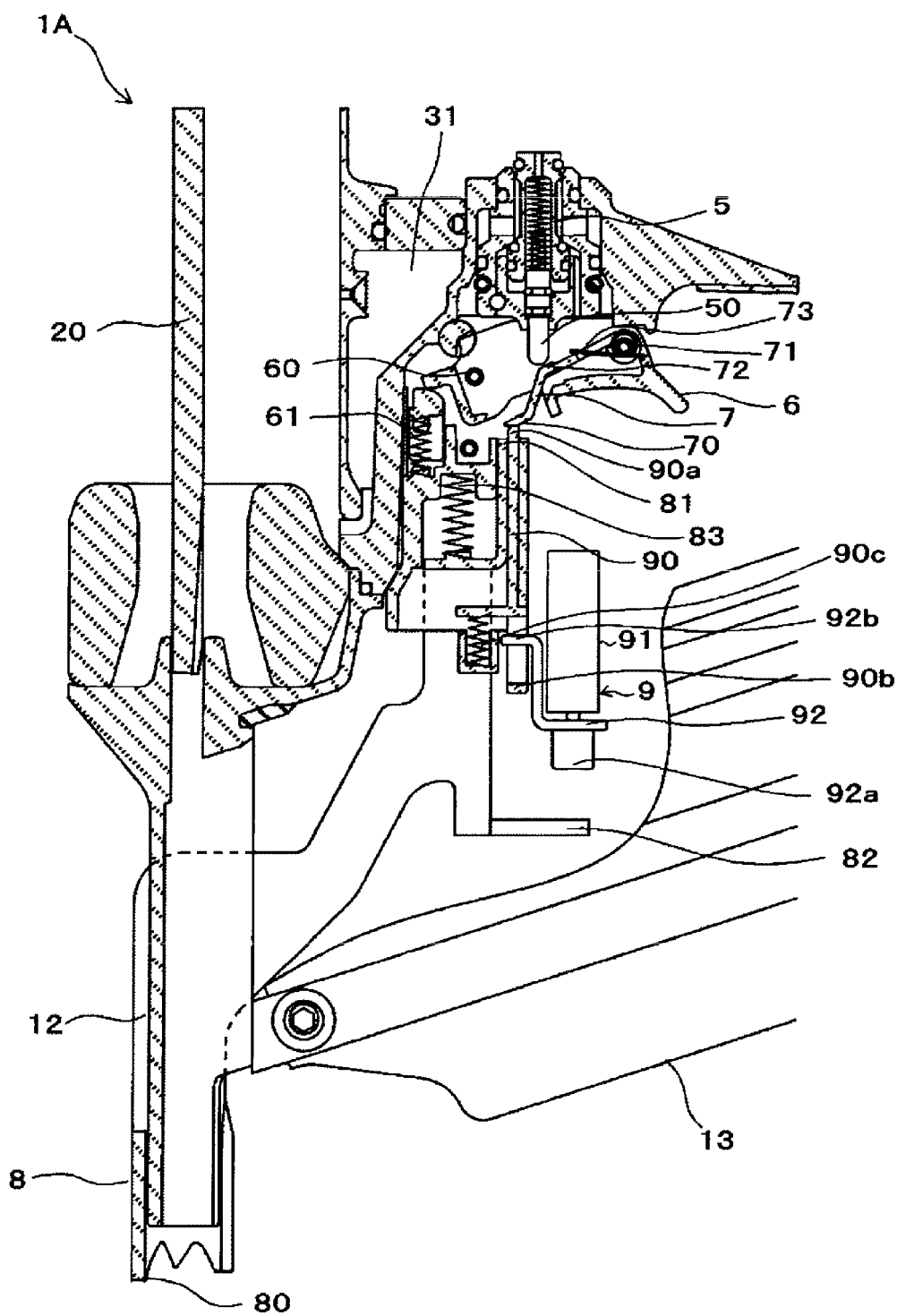
FIG. 6 is an illustrative diagram illustrating an example of an operation of the nailing machine according to the first embodiment.

While the trigger 6 is at the operating position and in a pulled state after the driving operation, the contact arm 8 moves from the actuating position thereof to the initial position thereof by the force of the spring 83 as illustrated in FIG. 6, by releasing a force of pressing the contact arm 8.

When the contact arm 8 moves to the initial position thereof, the pushing against the contact lever 7 by the first pushing portion 81 is released, and the contact lever 7 starts moving in a direction of returning from the actuation possible position thereof toward the initial position thereof by the rotation operation using the shaft 71 as a fulcrum by a force of the spring 73.

The regulating member 90 that is moved to the return regulating position regulates the movement of the contact lever 7 that moves in the direction of returning from the actuation possible position thereof toward the initial position thereof, with the pushing portion 90a positioned on a movement path of the contact lever 7.

Accordingly, when the contact arm 8 moves to the initial position thereof, the contact lever 7 moves to come into contact with the pushing portion 90a of the regulating member 90 and stops at the engagement possible position thereof. Further, the contact lever 7 having moved to the engagement possible position thereof has the engaging portion 70 thereof positioned on a movement path of the first pushing portion 81 of the contact arm 8.

Figure 13:
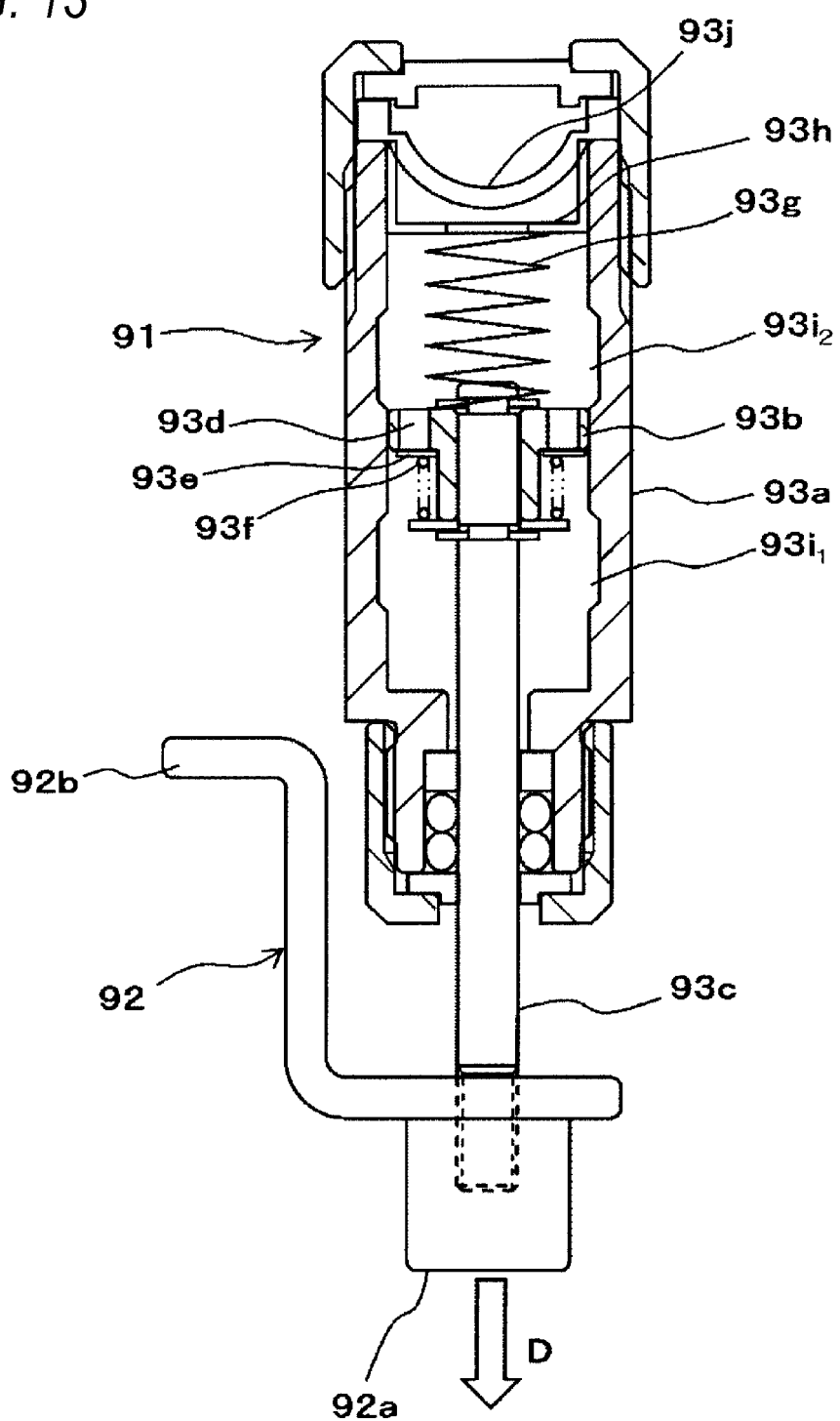
FIG. 13 is an illustrative diagram illustrating an example of an operation of the oil damper according to the first embodiment.

In addition, when the contact arm 8 moves to the initial position thereof, the pushing against the moving member 92 of the oil damper 91 by the second pushing portion 82 of the contact arm 8 is released, so that, in the oil damper 91, the piston 93b is pushed by the force to extend of the compressed spring 93g as illustrated in FIG. 13 and the moving member 92 starts moving in a direction of returning from the clocking starting position thereof toward the initial position thereof as indicated by an arrow D.

In the operation of moving the piston 93b in the direction in which the moving member 92 moves from the clocking starting position thereof to the initial position thereof, the oil flows from the one surface to the other surface side of the piston 93b. Accordingly, the check valve 93e is pushed against the piston 93b due to being pushed by the valve opening and closing spring 93f and the oil, and the state where the hole portions 93d are blocked by the check valve 93e is maintained.

In addition, when the piston 93b passes past the position facing the second bypass flow path $93i_2$ in the operation of moving the moving member 92 from the clocking starting position thereof to the initial position thereof, the gap between the outer circumferential surface of the piston 93b and the inner circumferential surface of the cylinder tube portion 93a is narrowed.

Accordingly, in the operation of moving the piston 93b in the direction in which the moving member 92 moves from the clocking starting position thereof toward the initial position thereof, the oil cannot pass through the hole portions 93d of the piston 93b, the resistance at the time the oil flows between the outer circumferential surface of the piston 93b and the inner circumferential surface of the cylinder tube portion 93a is increased, and the load applied when the piston 93b moves is increased. Therefore, the moving speed of the piston 93b moved by the force to extend of the spring 93g is reduced, and becomes a constant one corresponding to magnitude of the load.

Figure 7:
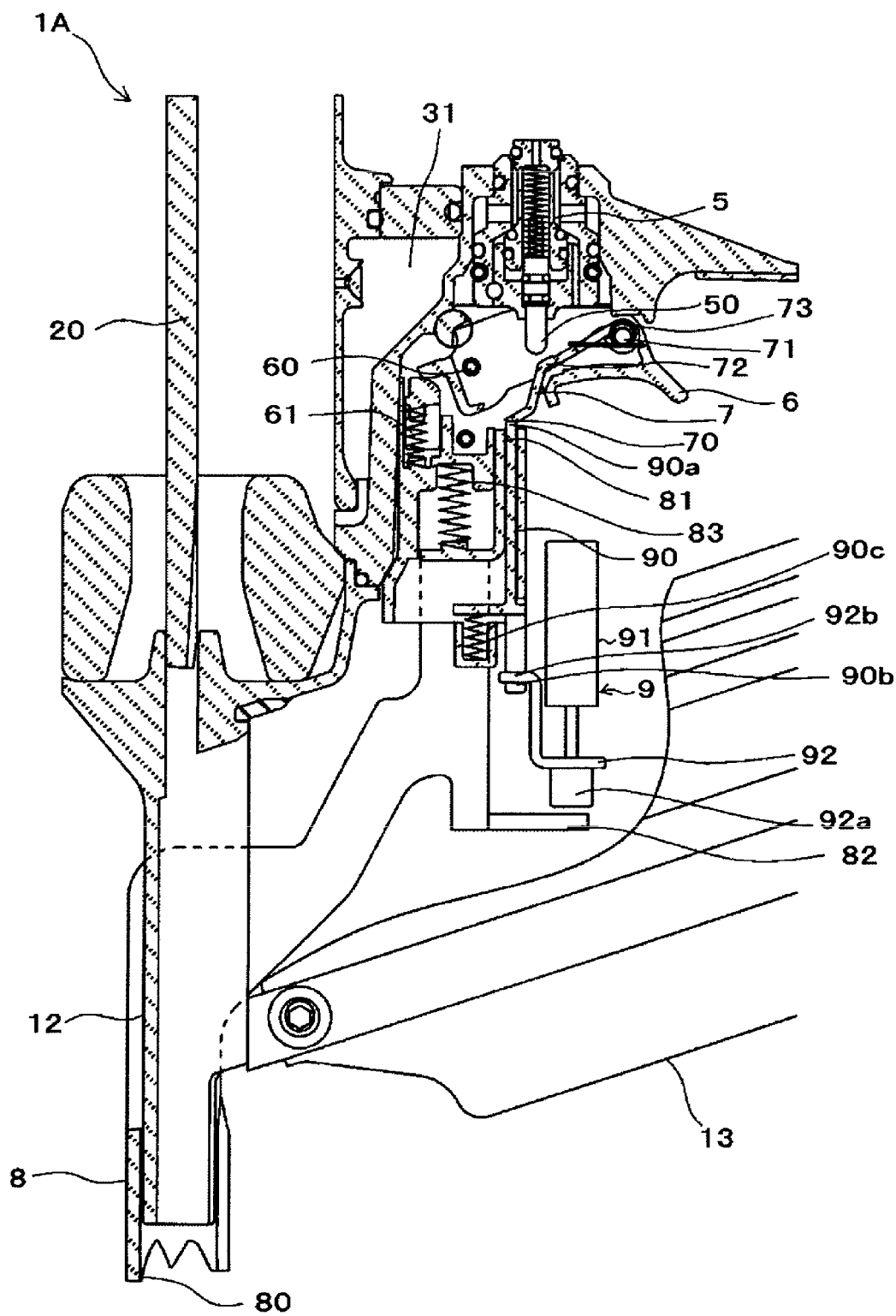
FIG. 7 is an illustrative diagram illustrating an example of an operation of the nailing machine according to the first embodiment.

As described, the moving member 92 moves from the clocking starting position thereof toward the initial position thereof by the force of the spring 93g, but the moving speed of the moving member 92 is controlled by the oil damper 91. Accordingly, the time period during which the moving member 92 moves from the clocking starting position thereof toward the initial position thereof is controlled, and while the engaging portion 92b of the moving member 92 and the engaged portion 90b of the regulating member 90 are in an unengaged state, the regulating member 90 stops at the return regulating position thereof as illustrated in FIG. 7.

Therefore, the engaging portion 70 is positioned on the movement path of the first pushing portion 81 of the contact arm 8 during a predetermined period of time in which the moving member 92 moves from the clocking starting position thereof to the initial position thereof, that is, during a period of time in which the engaging portion 92b of the moving member 92 and the engaged portion 90b of the regulating member 90 are in an unengaged state.

Accordingly, when the contact arm 8 having moved to the initial position thereof moves from the initial position thereof to the actuating position thereof again by being pressed against the object before the predetermined period of time in which the moving member 92 moves from the clocking starting position thereof to the initial position thereof elapses, with the trigger 6 being in the operating position thereof and in a pulled state, the first pushing portion 81 of the contact arm 8 can push the engaging portion 70 of the contact lever 7.

Therefore, when the contact arm 8 having moved to the initial position thereof is moved to the actuating position thereof again within the predetermined period of time, with the trigger 6 being in the operating position thereof and in a pulled state, the engaging portion 70 of the contact lever 7 is pushed by the first pushing portion 81 of the contact arm 8, the contact lever 7 moves to the actuation possible position thereof, and the pushing portion 72 pushes the valve stem 50 of the actuating valve 5, as illustrated in FIG. 5.

Therefore, a continuous driving operation can be performed by an operation of pressing the contact arm 8 against the object during the predetermined period time, with the trigger 6 being in the operating position thereof and in a pulled state.

In contrast, when the predetermined period of time elapses since the contact arm 8 moves to the initial position thereof, with the trigger 6 being in the operating position thereof and in a pulled state, the moving member 92 moves to the initial position thereof due to the oil damper 91.

Figure 14:
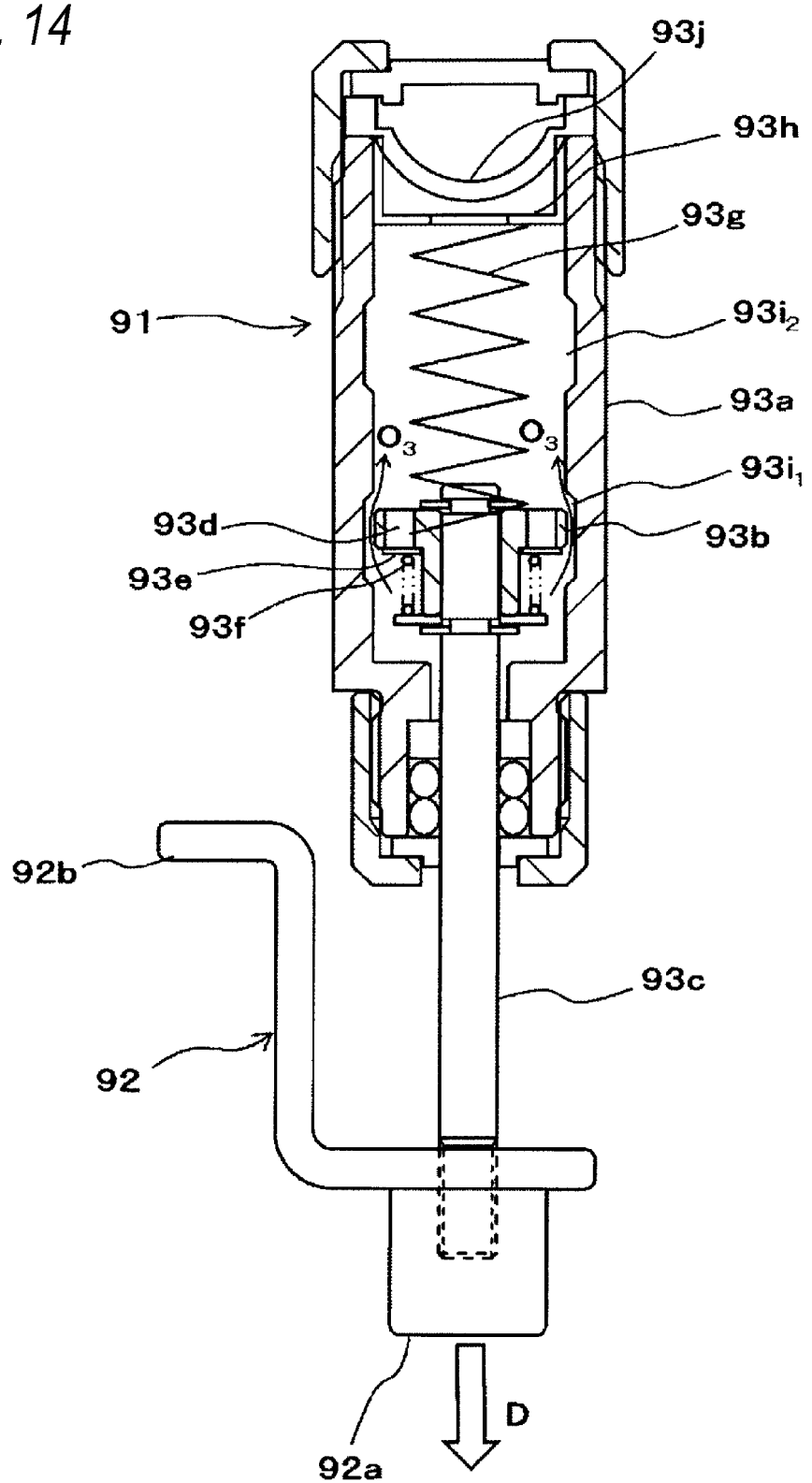
FIG. 14 is an illustrative diagram illustrating an example of an operation of the oil damper according to the first embodiment.

When the moving member 92 moves to the vicinity of the initial position thereof, the piston 93b faces the first bypass flow path 93$i_1$ as illustrated in FIG. 14. Accordingly, as indicated by the arrow D, in the operation of moving the piston 93b in the direction in which the moving member 92 moves from the clocking starting position thereof toward the initial position thereof, the resistance at the time the oil flows as indicated by an arrow $O_3$ between the outer circumferential surface of the piston 93b and the inner circumferential surface of the cylinder tube portion 93a is reduced and the load applied when the piston 93b moves is reduced.

In a state where the moving member 92 is moved to the vicinity of the initial position thereof, the compression amount of the spring 93g is reduced, and the reaction force to return the piston 93b is reduced. In this state, since the load applied when the piston 93b moves is reduced, the moving member 92 can be reliably moved to the initial position thereof by the force to extend of the spring 93g.

Figure 8:
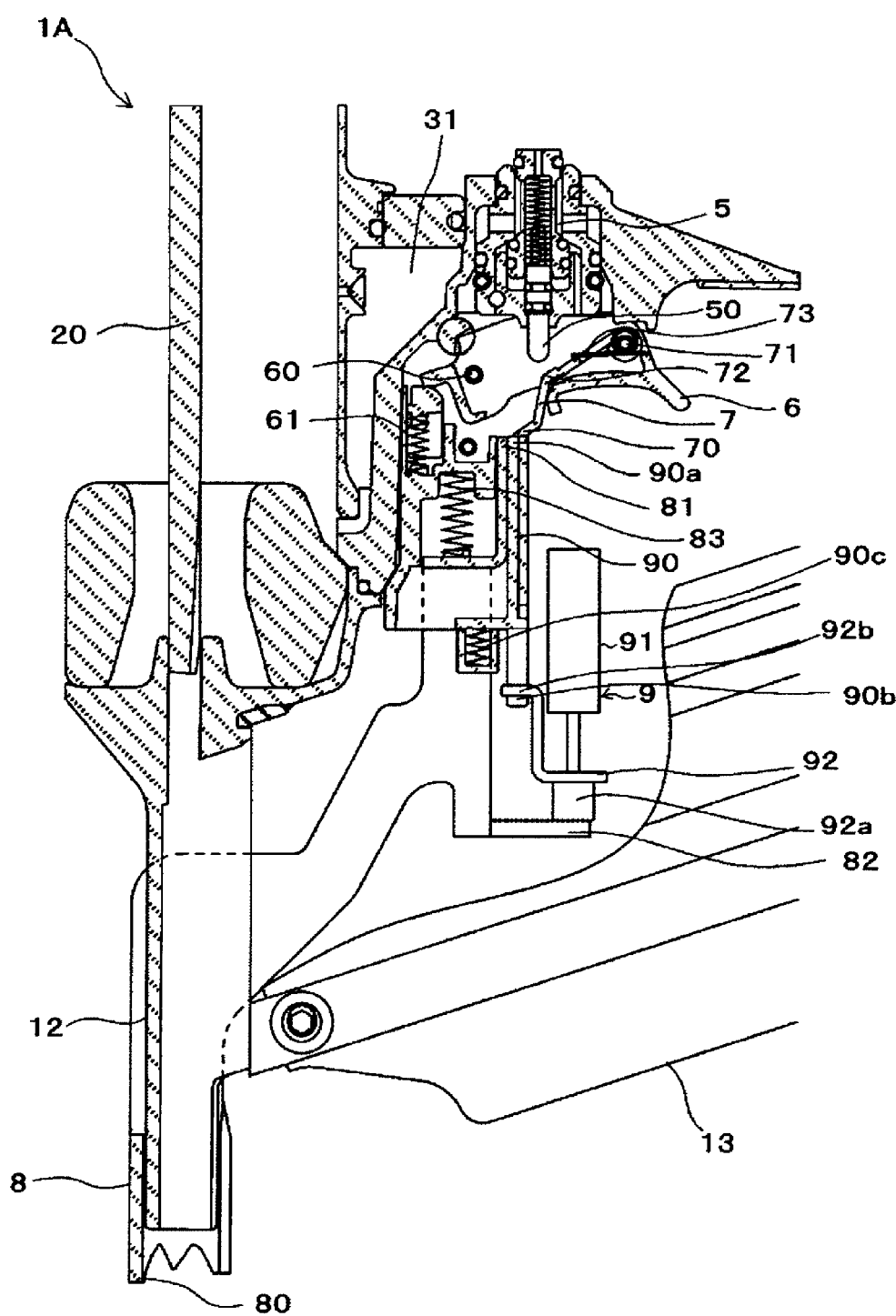
FIG. 8 is an illustrative diagram illustrating an example of an operation of the nailing machine according to the first embodiment.

When the moving member 92 moves to the initial position thereof, as illustrated in FIG. 8, the engaging portion 92b of the moving member 92 and the engaged portion 90b of the regulating member 90 are engaged. Accordingly, the regulating member 90 moves from the return regulating position thereof to the initial position thereof by being pressed by the moving member 92 that is moved by the oil damper 91.

When the regulating member 90 moves to the initial position thereof, the contact lever 7 moves from the engagement possible position to the initial position thereof, by the rotation operation using the shaft 71 as a fulcrum by the spring 73, in a case where the trigger 6 is in the operating position thereof. When the contact lever 7 moves to the initial position thereof with the trigger 6 in the operating position thereof, the engaging portion 70 of the contact lever 7 is retracted from the moving path of the first pushing portion 81 of the contact arm 8.

Figure 9:
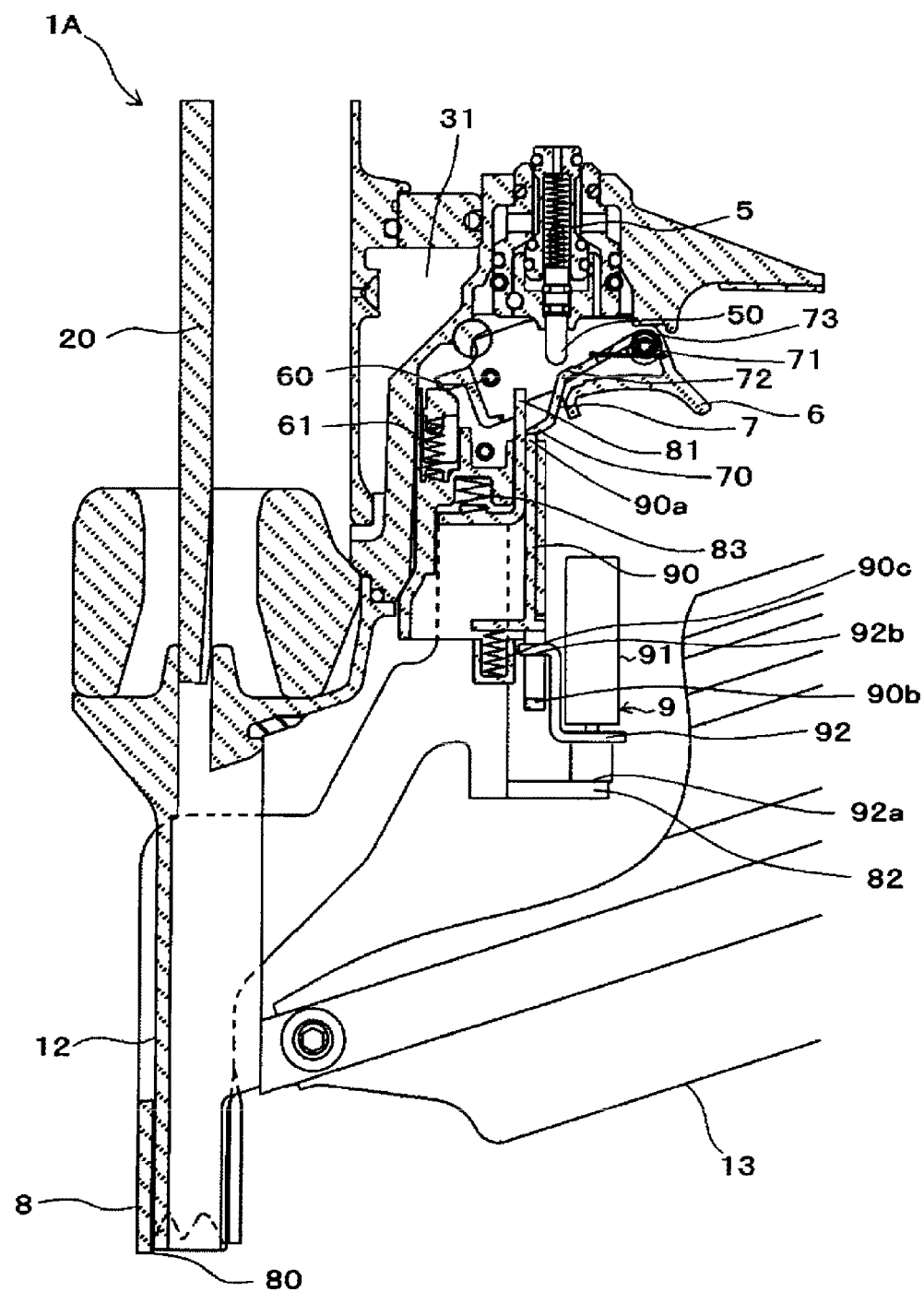
FIG. 9 is an illustrative diagram illustrating an example of an operation of the nailing machine according to the first embodiment.

Accordingly, when the predetermined period of time elapses since the contact arm 8 moves to the initial position thereof, with the trigger 6 being in the operating position thereof and in a pulled state, even when the contact arm 8 moves to the actuating position thereof by the operation of pressing the contact arm 8 against the object, the first pushing portion 81 of the contact arm 8 does not contact the engaging portion 70 of the contact lever 7 and the contact lever 7 is not pushed, as illustrated in FIG. 9.

Therefore, the actuating valve 5 is not pushed by the contact lever 7, and the driving operation is not performed. Therefore, the continuous driving operation by pressing the contact arm 8 against the object, with the trigger 6 being in the operating position thereof and in a pulled state, can be regulated by lapse of time using a mechanical configuration.

As described above, when the predetermined period of time elapses since the driving operation completes, the contact lever 7 moves to the initial position thereof. After the contact lever 7 moves to the initial position thereof, the contact arm 8 is moved to the initial position thereof by releasing the force of pressing the contact arm 8. In addition, the trigger 6 moves to the initial position thereof by releasing the force of pulling the trigger 6. Accordingly, the initial state as illustrated in FIG. 1 is recovered. In the initial state, the engaging portion 70 of the contact lever 7 moves to the moving path of the first pushing portion 81 of the contact arm 8.

Accordingly, when the trigger 6 moves to the operating position there by being pulled as illustrated in FIG. 5 after the contact arm 8 moves to the actuating position thereof by the operation of being pressed against the object as illustrated in FIG. 4, the valve stem 50 of the actuating valve 5 is pushed by the contact lever 7 that is moved to the actuation possible position thereof, and the driving operation is performed.

When the trigger 6 moves to the operating position thereof by being pulled before the contact arm 8 is pressed against the object from the initial state illustrated in FIG. 1, the engaging portion 70 of the contact lever 7 is retracted from the moving path of the first pushing portion 81 of the contact arm 8.

Accordingly, after the trigger 6 is in the operating position thereof and in a pulled state from the initial state, the first pushing portion 81 of the contact arm 8 does not contact the engaging portion 70 of the contact lever 7 and the contact lever 7 is not pushed, even when the contact arm 8 moves to the actuating position thereof by the operation of being pressed against the object.

Therefore, the valve stem 50 of the actuating valve 5 is not pushed by the contact lever 7, and the driving operation is not performed. Therefore, it is possible to regulate a driving operation that is by an operation other than an operation of a normal procedure of pressing the contact arm 8 against the object before pulling the trigger 6.

Effect Example of Oil Damper of First Embodiment

The oil damper 91 is provided to reduce the moving speed of the moving member 92 in the operation of moving from the clocking starting position thereof to the initial position thereof, and provides the load applied when the piston 93b moves with the viscosity of the oil. On the other hand, in the operation of moving the moving member 92 from the initial position thereof toward the clocking starting position thereof by pressing the contact arm 8 against the object, the viscosity of the oil acts as a load applied when the piston 93b moves, and the operating load of the contact arm 8 increases.

Therefore, the oil damper 91 is provided with the check valve 93e on the piston 93b. The hole portions 93d of the piston 93b are opened when the piston 93b moves in a direction in the operation of pressing the contact arm 8 against the object, thereby reducing the load applied when the piston 93b moves. Accordingly, the operating load of the contact arm 8 is reduced. In addition, when the piston 93b moves in a direction in the operation of moving the moving member 92 from the clocking starting position thereof to the initial position thereof, the hole portions 93d of the piston 93b are closed by the check valve 93e, so that the load required when the piston 93b moves can be applied.

Further, since the oil damper 91 is provided with the first bypass flow path $93i_1$, when the moving member 92 moves to the vicinity of the initial position thereof in the operation of moving the piston 93b in the direction in which the moving member 92 moves from the clocking starting position thereof toward the initial position thereof, the resistance at the time the oil flows between the outer circumferential surface of the piston 93b and the inner circumferential surface of the cylinder tube portion 93a is reduced and the load applied when the piston 93b moves is reduced.

When the load applied when the piston 93b moves is large in a state where the compression amount of the spring 93g is reduced and where the force to return the piston 93b is reduced, the force to return the piston 93b is small, there is a possibility that the moving member 92 cannot be moved to the initial position during the predetermined period of time. In such a case, a continuous driving operation may be possible by the operation of pressing the contact arm 8 against the object even if the predetermined period of time elapses, with the trigger 6 being in the operating position thereof and in a pulled state.

In contrast, in the state where the compression amount of the spring 93g is reduced and the force to return the piston 93b is reduced, the moving member 92 can be reliably moved to the initial position thereof during the predetermined period of time by the force to extend of the spring 93g since the load applied when the piston 93b moves is reduced. Therefore, it is possible to reliably control a period of time, during which the continuous driving operation can be performed, by the operation of pressing the contact arm 8 against the object with the trigger 6 being in the operating position thereof and in a pulled state.

Further, when the force applied to the piston 93b by the spring 93g is reduced by providing the first bypass flow path $93i_1$ in accordance with a position of the piston 93b where the load is desired to be reduced, the resistance of the oil at the time the piston 93b moves can be reduced, and a configuration can be easily implemented in which the resistance of the oil at the time the piston 93b moves is changed in accordance with a change in the force applied to the piston 93b by the spring 93g.

Since the oil damper 91 is provided with the second bypass flow path $93i_2$, when the moving member 92 moves to the vicinity of the clocking starting position thereof in the operation of moving the piston 93b in the direction in which the moving member 92 moves from the initial position thereof toward the clocking starting position thereof, the resistance at the time the oil flows between the outer circumferential surface of the piston 93b and the inner circumferential surface of the cylinder tube portion 93a is reduced and the load applied when the piston 93b moves is reduced.

In a state where the compression amount of the spring 93g is increased and the reaction force to return the piston 93b is increased, the operating load of the contact arm 8 is reduced since the load applied when the piston 93b moves is reduced. Here, the second bypass flow path $93i_2$ may not be provided.

Configuration Example of Oil Damper of Second Embodiment

Figure 15:
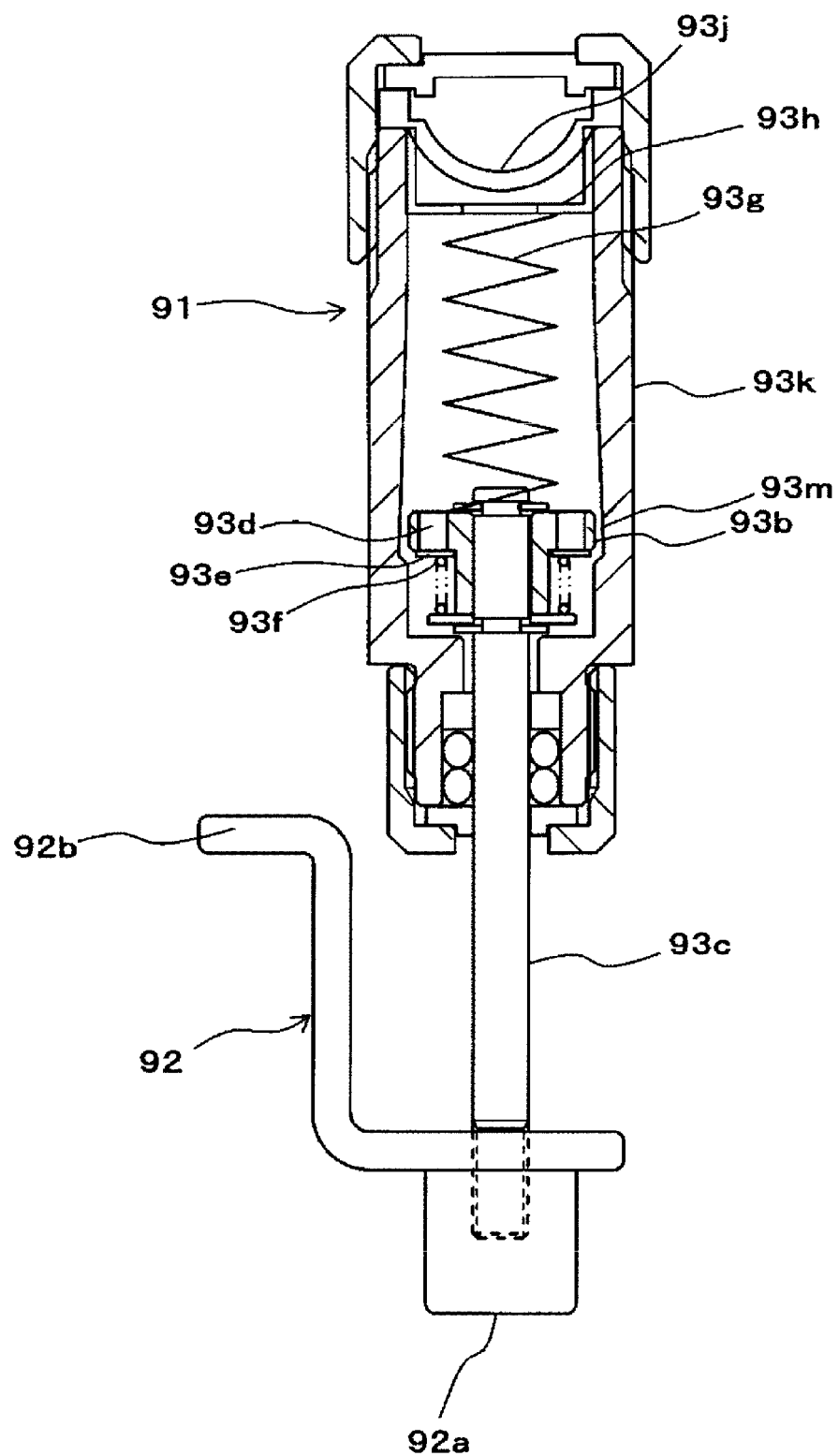
FIG. 15 is a cross-sectional view illustrating an oil damper according to a second embodiment.

FIG. 15 is a cross-sectional view illustrating an oil damper according to a second embodiment. The oil damper 91 of the second embodiment includes a cylinder tube portion 93k that is filled with oil, the piston 93b that is provided so as to be movable in an inner portion of the cylinder tube portion 93k and whose moving speed is controlled with viscosity of the oil, and the piston shaft portion 93c that transmits movement of the piston 93b to the moving member 92.

The cylinder tube portion 93k is provided with a space that is defined in a substantially cylindrical shape and that is filled with oil. The piston 93b has a circular shape conforming to a shape of an inner circumferential surface of the cylinder tube portion 93k, and a plurality of hole portions 93d through which the oil passes are provided so as to penetrate both sides of the piston 93b. One end portion of the piston shaft portion 93c is attached to the piston 93b, and the other end portion thereof protruding from the cylinder tube portion 93a is coupled to the moving member 92.

The oil damper 91 includes the check valve 93e that switches a load in accordance with a direction, in which the piston 93b moves, by opening and closing the hole portions 93d in accordance with the direction in which the piston 93b moves. The check valve 93e is movable in a direction of separating from the piston 93b along the moving direction of the piston 93b, and is biased by the valve opening and closing spring 93f in a direction to be pushed against the piston 93b.

In an operation of moving the piston 93b in a direction in which the moving member 92 moves from an initial position thereof to a clocking starting position thereof, the check valve 93e is pushed by the oil passing through the hole portions 93d, so that the check valve 93e is separated from one surface of the piston 93b while compressing the valve opening and closing spring 93f and the hole portions 93d are opened.

In contrast, in an operation of moving the piston 93b in a direction in which the moving member 92 moves from the clocking starting position thereof to the initial position thereof, the check valve 93e is pushed against the piston 93b by being pushed by the valve opening and closing spring 93f and the oil, and the hole portions 93d are blocked by the check valve 93e.

The oil damper 91 includes the spring 93g that presses the piston 93b. The spring 93g is an example of a biasing member, is configured with a coil spring, and is provided between the spring retainer 93h provided in the inner portion of the cylinder tube portion 93k and the other surface of the piston 93b.

The oil damper 91 includes a bypass flow path 93m that reduces a load applied when the piston 93b moves. The bypass flow path 93m is an example of a flow path expanded portion, and is provided to face a position of the piston 93b that is in a state where the moving member 92 is moved to the vicinity of the initial position thereof, which is a terminal position of a movement range of the piston 93b that is moved by a force applied by the spring 93g. The inner circumferential surface of the cylinder tube portion 93k is in a tapered shape such that an inner diameter gradually increases toward a portion facing the piston 93b in a state where the moving member 92 is moved to the vicinity of the initial position thereof, and an inner diameter of a portion where the bypass flow path 93m is provided is larger than an inner diameter of a portion where the bypass flow path 93m is not provided.

Accordingly, in the operation of moving the moving member 92 from the clocking starting position thereof toward the initial position thereof, a gap between an outer circumferential surface of the piston 93b and the inner circumferential surface of the cylinder tube portion 93k gradually widens, and area of a flow path through which the oil flows when the piston 93b moves gradually increases.

Therefore, when the piston 93b moves to the position facing the bypass flow path 93m by moving the moving member 92 to the vicinity of the initial position thereof, resistance at the time the oil flows between the outer circumferential surface of the piston 93b and the inner circumferential surface of the cylinder tube portion 93k is reduced and a load applied when the piston 93b moves is reduced, in the operation of moving the piston 93b.

The oil damper 91 includes a diaphragm 93j that keeps a volume in the cylinder tube portion 93k substantially constant regardless of the position of the piston 93b. The diaphragm 93j is configured with an elastically deformable member and is provided on the other end portion side of the cylinder tube portion 93k.

In the oil damper 91 configured as described above, the moving member 92 moves from the clocking starting position thereof to the initial position thereof by a force to extend of the spring 93g, and a moving speed of the moving member 92 is controlled with the load applied when the piston 93b moves in the cylinder tube portion 93k due to the viscosity of the oil. In addition, when the moving member 92 moves to the vicinity of the initial position thereof by the force to extend of the spring 93g, the piston 93b moves to the position facing the bypass flow path 93m, the resistance at the time the oil flows between the outer circumferential surface of the piston 93b and the inner circumferential surface of the cylinder tube portion 93k is reduced, and the load applied to the piston 93b when the moving member 92 moves toward the initial position thereof is reduced.

FIGS. 16 to 20 are illustrative diagrams illustrating examples of operations of the oil damper according to the second embodiment, and among operations of the nailing machine 1A, the operations of the oil damper according to the second embodiment will be described.

Figure 16:
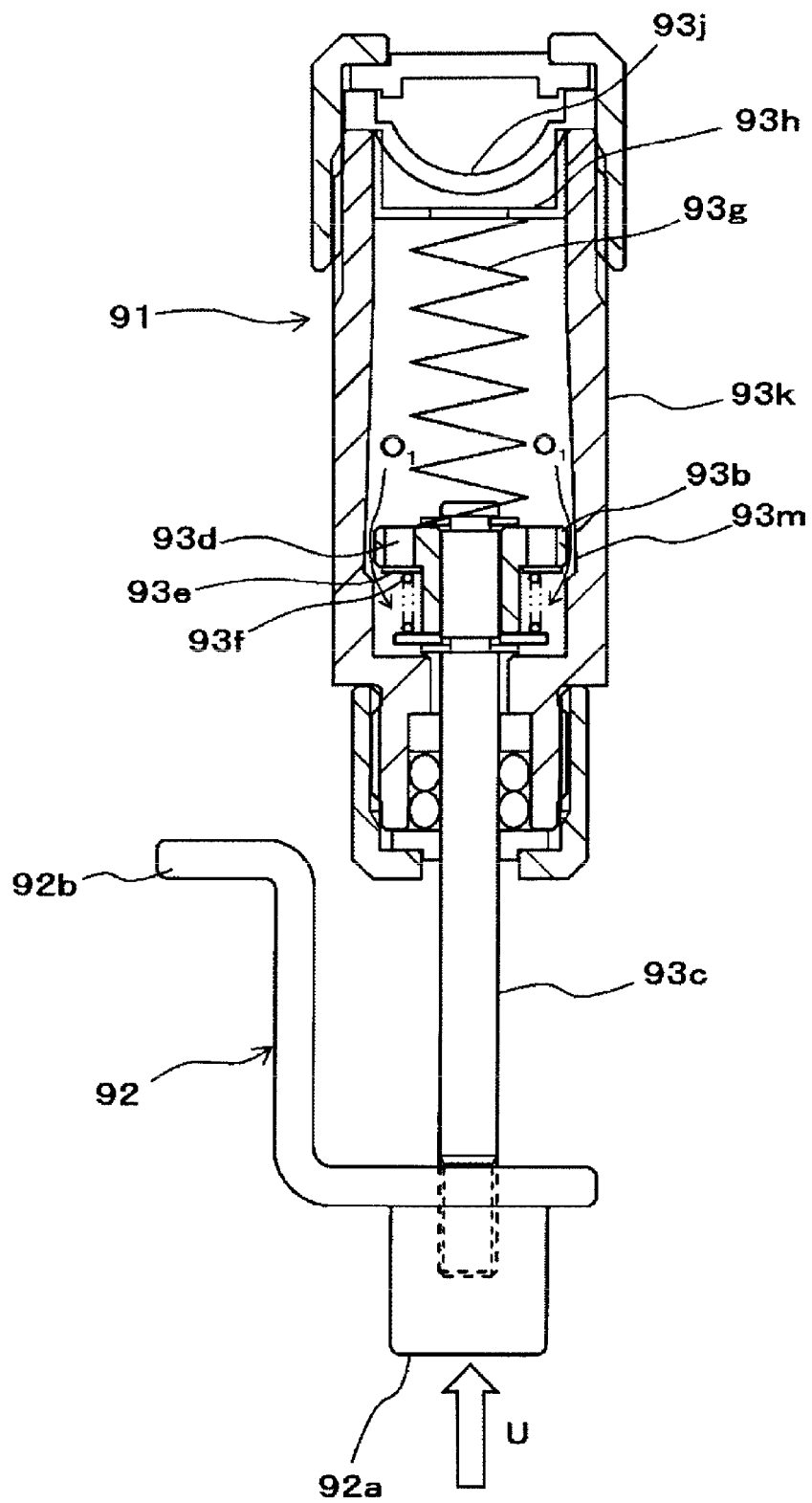
FIG. 16 is an illustrative diagram illustrating an example of an operation of the oil damper according to the second embodiment.

When the moving member 92 is moved to the initial position thereof as illustrated in FIG. 1, the piston 93b faces the bypass flow path 93m in the oil damper 91 as illustrated in FIG. 16. Accordingly, while the moving member 92 is positioned in the vicinity of the initial position thereof in the operation of moving the piston 93b in the direction in which the moving member 92 moves from the initial position thereof toward the clocking starting position thereof as indicated by an arrow U, the resistance at the time the oil flows as indicated by an arrow $O_1$ between the outer circumferential surface of the piston 93b and the inner circumferential surface of the cylinder tube portion 93k is reduced and the load applied when the piston 93b moves is reduced.

Further, in the operation of moving the piston 93b moves in the direction in which the moving member 92 moves from the initial position thereof toward the clocking starting position thereof, the oil flows from the other surface to the one surface side of the piston 93b.

Accordingly, the check valve 93e is pushed by the oil passing through the hole portions 93d, so that the check valve 93e is separated from the one surface of the piston 93b while compressing the valve opening and closing spring 93f and the hole portions 93d are opened.

Figure 17:
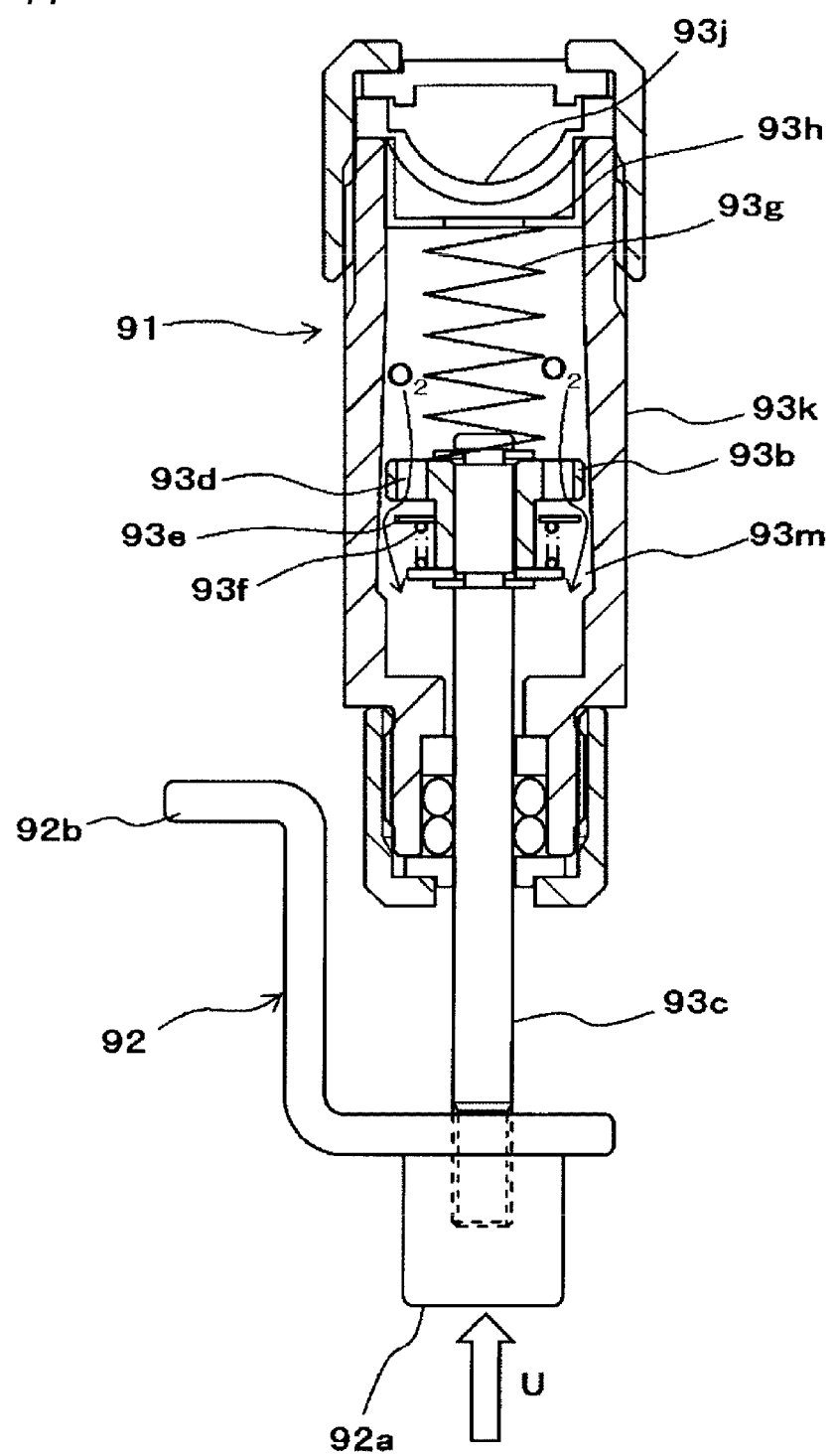
FIG. 17 is an illustrative diagram illustrating an example of an operation of the oil damper according to the second embodiment.

In the operation of moving the moving member 92 from the initial position thereof to the clocking starting position thereof, the gap between the outer circumferential surface of the piston 93b and the inner circumferential surface of the cylinder tube portion 93k gradually narrows as illustrated in FIG. 17. On the other hand, when the hole portions 93d of the piston 93b open, the oil flows from the other surface, through the hole portions 93d, to the one surface side of the piston 93b as indicated by an arrow 02. Accordingly, the load applied when the piston 93b moves is reduced.

Since the piston 93b is pushed by the contact arm 8 via the moving member 92, an operating load of the contact arm 8 is reduced when the load applied at the time the piston 93b moves is reduced.

Figure 18:
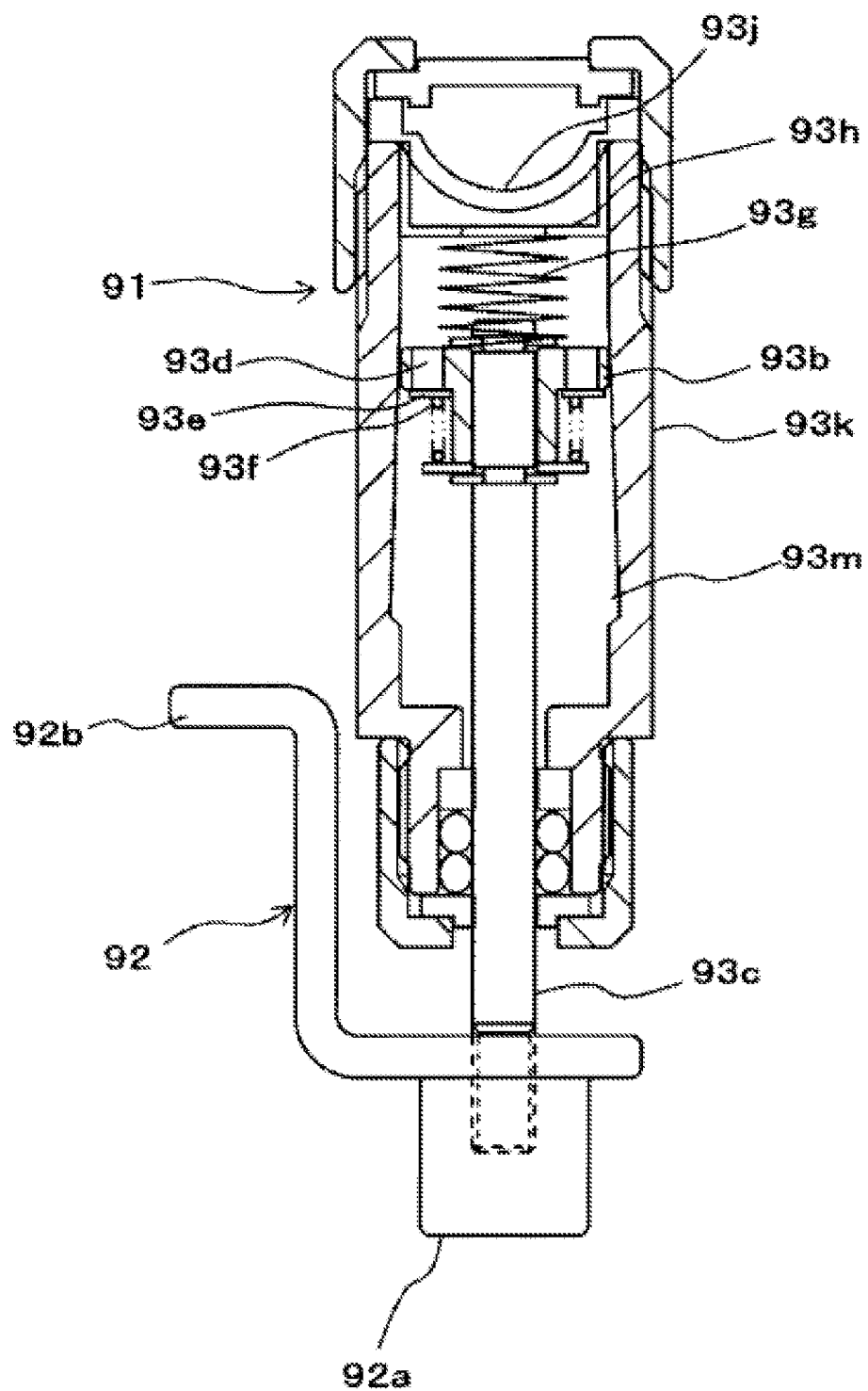
FIG. 18 is an illustrative diagram illustrating an example of an operation of the oil damper according to the second embodiment.

When the moving member 92 moves to the vicinity of the clocking starting position thereof and stops, the check valve 93e is pushed against the piston 93b by being pushed by the valve opening and closing spring 93f and the hole portions 93d are blocked by the check valve 93e, as illustrated in FIG. 18.

Figure 19:
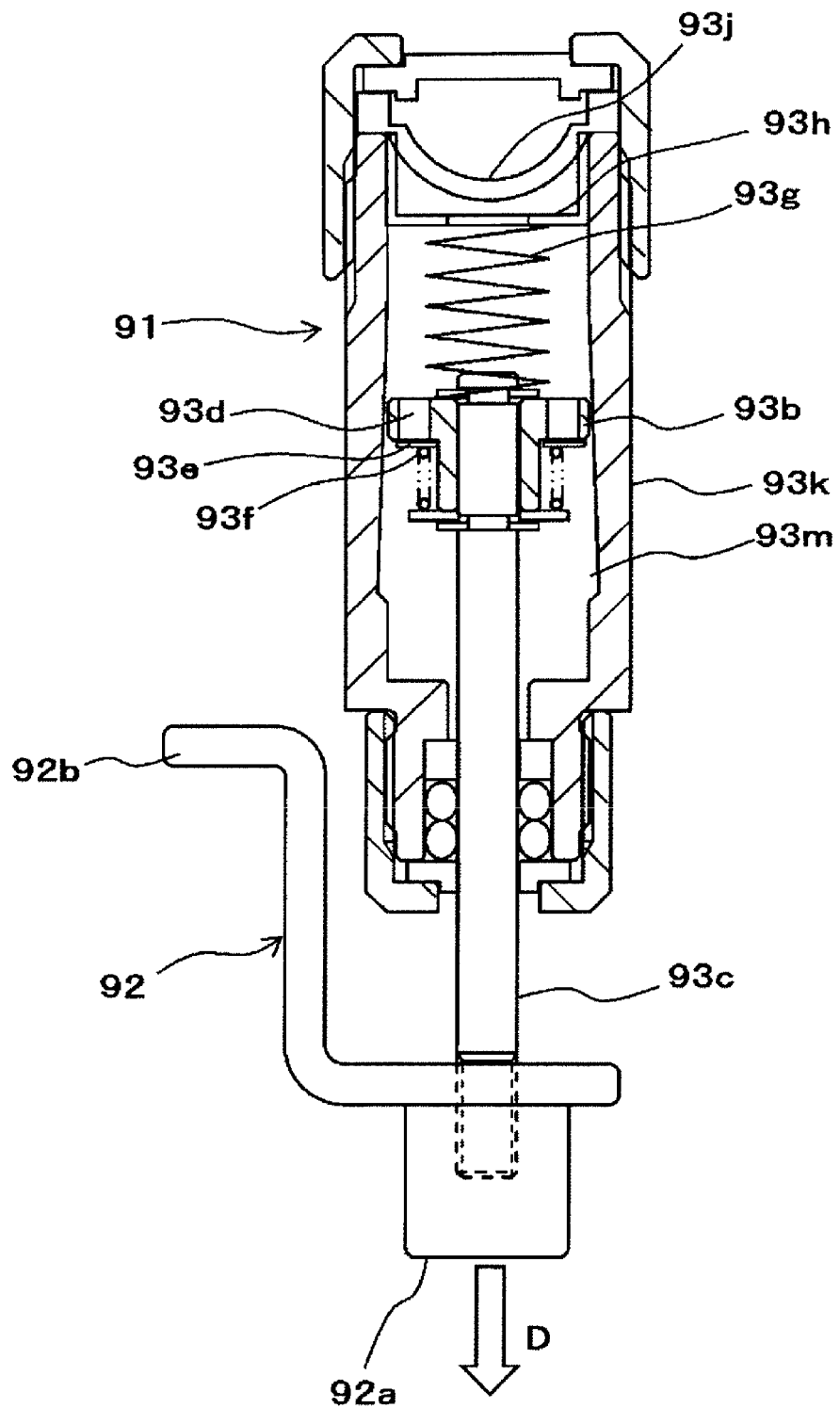
FIG. 19 is an illustrative diagram illustrating an example of an operation of the oil damper according to the second embodiment.

When the contact arm 8 moves to the initial position thereof by releasing a force of pressing the contact arm 8 after a driving operation, the pushing against the moving member 92 of the oil damper 91 by the second pushing portion 82 of the contact arm 8 is released, so that, in the oil damper 91, the piston 93b is pushed by the force to extend of the compressed spring 93g as illustrated in FIG. 19 and the moving member 92 starts moving in a direction of returning from the clocking starting position thereof toward the initial position thereof as indicated by an arrow D.

In the operation of moving the piston 93b in the direction in which the moving member 92 moves from the clocking starting position thereof to the initial position thereof, the oil flows from the one surface to the other surface side of the piston 93b. Accordingly, the check valve 93e is pushed against the piston 93b due to being pushed by the valve opening and closing spring 93f and the oil, and the state where the hole portions 93d are blocked by the check valve 93e is maintained.

Accordingly, in the operation of moving the piston 93b in the direction in which the moving member 92 moves from the clocking starting position thereof toward the initial position thereof, the oil cannot pass through the hole portions 93d of the piston 93b, the resistance at the time the oil flows between the outer circumferential surface of the piston 93b and the inner circumferential surface of the cylinder tube portion 93k is increased, and the load applied when the piston 93b moves is increased. Therefore, the moving speed of the piston 93b moved by the extending force of the spring 93g is reduced, and becomes a constant one corresponding to magnitude of the load.

Figure 20:
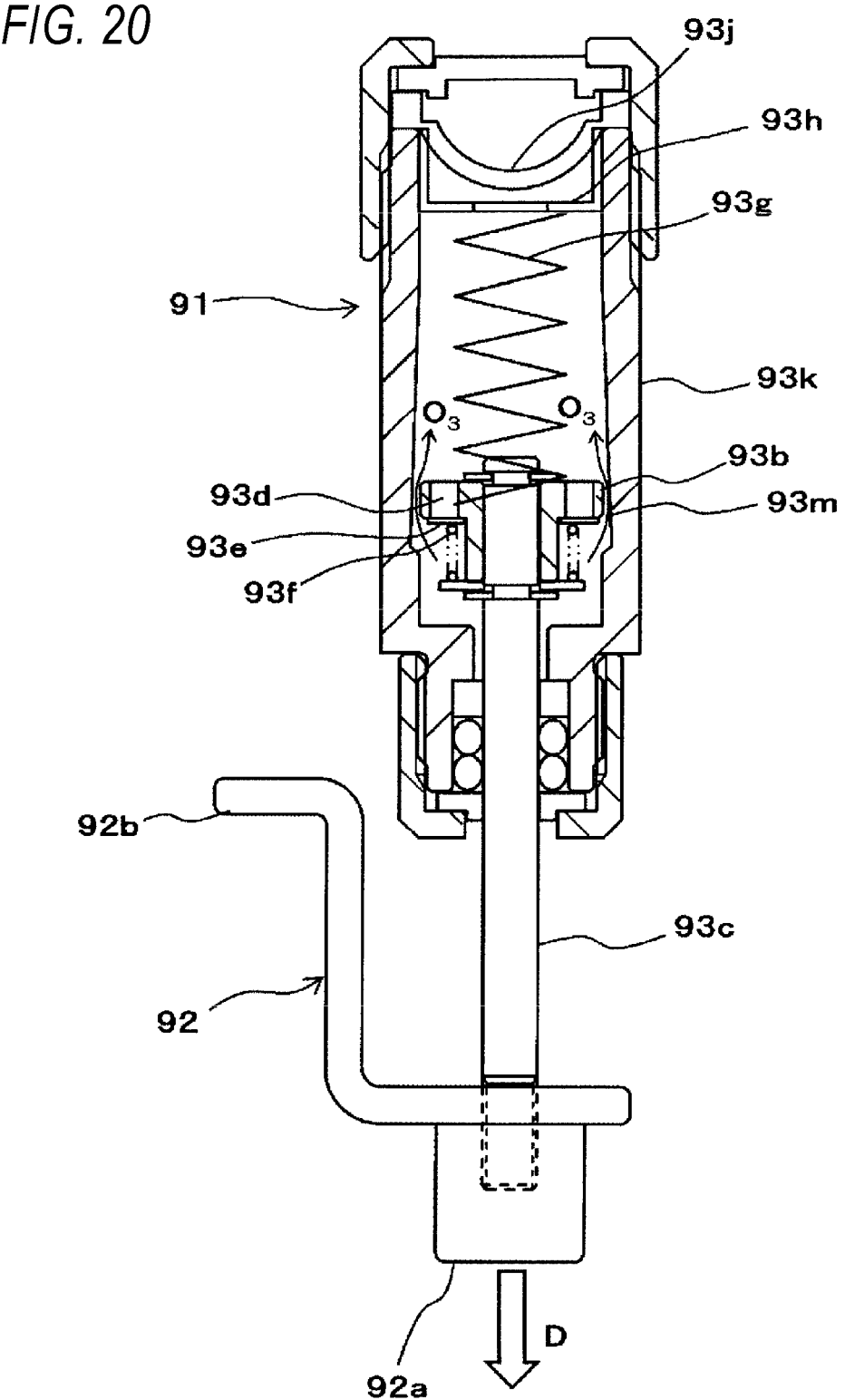
FIG. 20 is an illustrative diagram illustrating an example of an operation of the oil damper according to the second embodiment.

When the moving member 92 moves to the vicinity of the initial position thereof, the piston 93b faces the bypass flow path 93m as illustrated in FIG. 20 Accordingly, as indicated by the arrow D, in the operation of moving the piston 93b in the direction in which the moving member 92 moves from the clocking starting position thereof toward the initial position thereof, the resistance at the time the oil flows as indicated by an arrow 03 between the outer circumferential surface of the piston 93b and the inner circumferential surface of the cylinder tube portion 93k is reduced and the load applied when the piston 93b moves is reduced.

In a state where the moving member 92 is moved to the vicinity of the initial position thereof, a compression amount of the spring 93g is reduced, and a force to return the piston 93b is reduced. In this state, since the load applied when the piston 93b moves is reduced, the moving member 92 can be reliably moved to the initial position thereof by the force to extend of the spring 93g. In addition, since the area of the flow path through which the oil flows when the piston 93b moves gradually increases in the operation of moving the moving member 92 from the clocking starting position thereof to the initial position thereof, it is possible to prevent an abrupt increase or decrease in resistance when the oil flows.

In the embodiments described above, it is disclosed that the area of the flow path through which the oil passes when the piston 93b moves changes. At the time of performing the clocking, since the hole portions 93d are blocked and do not function as a flow path, this "change in area of the flow path" can be rephrased as "change in cross-sectional area" between the outer circumferential surface of the piston 93b and the inner circumferential surface of the cylinder tube portion 93a.

In the embodiments described above, oil dampers using the resistance due to the viscosity of oil are described as examples of the fluid damper of the present invention, and the present invention is not limited thereto. The present invention is applicable to various types of cylinder dampers, for example, a damper obtained by filling and enclosing a liquid different from oil in a cylinder, a damper obtained by filling and enclosing a gas such as nitrogen gas in a cylinder instead of oil, or a damper having a configuration of controlling inflow of gas into a cylinder and outflow of the gas from inside the cylinder.

In the embodiments described above, a nailing machine that drives a nail is described as an example of the driving tool of the present invention, and the present invention is not limited thereto. The present invention is also applicable to, for example, a screw driving machine that drives a screw.

This application is based on Japanese Patent Application No. 2018-036896 filed on Mar. 1, 2018, the contents of which are incorporated herein by reference.

REFERENCE SIGNS LIST 1A nailing machine (driving tool); 10 housing; 11 handle; 12 nose; 13 magazine; 2 driving cylinder (driving mechanism); 20 driver; 21 driving piston; 3 air chamber; 30 air plug; 31 blowback chamber; 4 main valve; 5 actuating valve; 50 valve stem; 6 trigger; 60 shaft; 61 spring; 7 contact lever; 70 engaging portion; 71 shaft; 72 pushing portion; 73 spring; 8 contact arm; 80 abutting portion; 81 first pushing portion; 82 second pushing portion; 83 spring; 9 regulating part; 90 regulating member; 90a pushing portion; 90b engaged portion; 90c spring; 91 oil damper; 92 moving member; 92a pushed portion; 92b engaging portion; 93a cylinder tube portion; 93b piston; 93c piston shaft portion; 93d hole portion; 93e check valve; 93f valve opening and closing spring; 93g spring (biasing member); 93h spring retainer; $93i_1$ first bypass flow path (flow path expanded portion); $93i_2$ second bypass flow path (flow path expanded portion); 93j diaphragm; 93k cylinder tube portion; 93m bypass flow path (flow path expanded portion)

The invention claimed is:

1. A driving tool comprising:
   a driving mechanism which drives a fastener supplied to a nose portion;
   a contact lever which is configured to switch between presence and absence of actuation of the driving mechanism; and
   a fluid damper which is configured to control a moving speed of the contact lever;
   wherein the fluid damper comprises:
   a cylinder tube portion which is filled with a fluid;
   a piston which is provided so as to be movable in an inner portion of the cylinder tube portion and whose moving speed is controlled with resistance of the fluid;
   a biasing member which expands and contracts in accordance with a position of the piston and which applies a force corresponding to an expansion and contraction amount of the biasing member to the piston,
   wherein the resistance of the fluid at a time the piston moves is changed in accordance with the position of the piston;
   a shaft portion which extends out from the cylinder tube portion, and which is moved by the piston;
   a moving member positioned outside of the cylinder tube portion and which is moved by the shaft portion; and
   a regulating member which is actuated by the moving member, wherein the regulating member is positioned between moving member and the contact lever, and the regulating member is configured to regulate a position of the contact lever.

2. The driving tool according to claim 1, wherein the resistance of the fluid at the time the piston moves is changed in accordance with a change in the force applied to the piston by the biasing member.

3. The driving tool according to claim 2, wherein the force applied to the piston by the biasing member changes in accordance with the expansion and contraction amount of the biasing member, and when the piston moves from a position where the force applied thereto by the biasing member is large to a position where the force applied thereto by the biasing member is small, the resistance of the fluid at the time the piston moves is reduced.

4. The driving tool according to claim 1, wherein the resistance of the fluid at the time the piston moves is changed by changing area of a flow path through which the fluid passes.

5. The driving tool according to claim 1 further comprising:
   a flow path expanded portion where area of a flow path through which the fluid passes is increased in accordance with a terminal position of a movement range of the piston which is moved by the force applied by the biasing member.

6. The driving tool according to claim 1, wherein the fluid damper includes a first bypass flow path, and an amount of fluid passing through the first bypass flow path varies with position of the piston with respect to the first bypass flow path.

7. The driving tool according to claim 6, wherein the fluid damper further includes a second bypass flow path and an amount of fluid passing through the second bypass flow path varies with position of the piston with respect to the second bypass flow path.

8. The driving tool according to claim 7, further including a hole which passes through the piston and which is selectively opened and closed by a check valve.

9. The driving tool according to claim 1, wherein the regulating member is positioned between the moving member and the contact lever with respect to a moving direction of the moving member.

10. A driving tool comprising:
a driving mechanism which drives a fastener supplied to a nose portion;
a trigger which receives one operation for actuating the driving mechanism;
a contact arm which is provided so as to be reciprocally movable and which receives another operation for actuating the driving mechanism;
a contact lever which is provided so as to be capable of being actuated by operations of the trigger and the contact arm and which is configured to switch between presence and absence of actuation of the driving mechanism; and
a fluid damper which is configured to control a moving speed of the contact lever, wherein
the fluid damper comprises:
a cylinder tube portion which is filled with a fluid;
a piston which is provided so as to be movable in an inner portion of the cylinder tube portion and whose moving speed is controlled with resistance of the fluid;
a biasing member which expands and contracts in accordance with a position of the piston and which applies a force corresponding to an expansion and contraction amount of the biasing member to the piston,
wherein the resistance of the fluid at a time the piston moves is changed in accordance with the position of the piston; and
the driving tool further including a hole which passes through the piston and which is selectively opened and closed by a check valve.

11. The driving tool according to claim 10 further comprising:
a regulating part which is configured to switch between presence and absence of actuation of the contact arm of the contact lever, wherein
the regulating part includes:
a moving member;
a regulating member which is actuated by the moving member and which is configured to regulate a position of the contact lever to an actuation standby position where the contact arm is able to actuate the contact lever; and
the fluid damper, and
the fluid damper is configured to control a moving speed of the moving member that actuates the regulating member.

12. The driving tool according to claim 11, further including:
a shaft portion which extends out from the cylinder tube portion and which is moved by the piston, and
wherein the moving member is moved by the shaft portion.

13. The driving tool according to claim 10, wherein the fluid damper includes a first bypass flow path and an amount of fluid passing through the first bypass flow path varies with position of the piston with respect to the first bypass flow path.

14. The driving tool according to claim 13, wherein the fluid damper further includes a second bypass flow path and an amount of fluid passing through the second bypass flow path varies with position of the piston with respect to the second bypass flow path.

15. A driving tool comprising:
a driving mechanism which drives a fastener supplied to a nose portion;
a contact lever which is configured to switch between presence and absence of actuation of the driving mechanism; and
a fluid damper which is configured to control a moving speed of the contact lever;
wherein the fluid damper comprises:
a cylinder tube portion which is filled with a fluid;
a piston which is provided so as to be movable in an inner portion of the cylinder tube portion and whose moving speed is controlled with resistance of the fluid; and
a biasing member which expands and contracts in accordance with a position of the piston and which applies a force corresponding to an expansion and contraction amount of the biasing member to the piston,
wherein the resistance of the fluid at a time the piston moves is changed in accordance with the position of the piston;
wherein the fluid damper includes a first bypass flow path, and an amount of fluid passing through the first bypass flow path varies with position of the piston with respect to the first bypass flow path; and
the driving tool further including a hole which passes through the piston and which is selectively opened and closed by a check valve.

16. The driving tool according to claim 15, wherein the fluid damper further includes a second bypass flow path and an amount of fluid passing through the second bypass flow path varies with position of the piston with respect to the second bypass flow path.

* * * * *